United States Patent
Alzaydi

(10) Patent No.: US 12,449,511 B1
(45) Date of Patent: Oct. 21, 2025

(54) RADAR SYSTEM FOR IDENTIFYING MATERIAL COMPOSITION OF AERIAL OBJECTS

(71) Applicant: King Fahd University of Petroleum and Minerals, Dhahran (SA)

(72) Inventor: Ammar Ayad Alzaydi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/239,611

(22) Filed: Jun. 16, 2025

(51) Int. Cl.
  *G01S 7/41* (2006.01)
  *G01S 13/91* (2006.01)
(52) U.S. Cl.
  CPC ............... *G01S 7/412* (2013.01); *G01S 7/417* (2013.01); *G01S 13/91* (2013.01)
(58) Field of Classification Search
  CPC ........... G01S 7/412; G01S 13/91; G01S 7/417
  See application file for complete search history.

(56) References Cited

U.S. PATENT DOCUMENTS

2019/0178982 A1    6/2019   Richert
2021/0190702 A1*   6/2021   Wu .......................... G01S 7/411

FOREIGN PATENT DOCUMENTS

IN    202331024818 A    4/2023
WO    2024/099155 A1    5/2024

OTHER PUBLICATIONS

Rami N. Khushaba, et al., "Radar-Based Materials Classification Using Deep Wavelet Scattering Transform: A Comparison of Centimeter vs. Millimeter Wave Units", IEEE Robotics and Automation Letters, vol. 7, No. 2, Jan. 14, 2022, pp. 2016-2022, Abstract only, 2 pages.

* cited by examiner

*Primary Examiner* — Calvin Y Choi
*Assistant Examiner* — Helena H Seraydaryan
(74) *Attorney, Agent, or Firm* — Oblon, McClelland, Maier &Neustadt, L.L.P.

(57) ABSTRACT

A system, method, and apparatus for identifying the material composition of aerial objects includes a transmitter configured to emit a white noise signal towards the aerial objects exhibiting a substantially flat power spectral density, and a receiver operable to capture a reflected signal from the aerial object. A signal processor, electrically coupled to the receiver, filters the reflected signal to generate a processed signal. An artificial intelligence processor analyzes the processed signal using a machine learning model to determine the material composition of the aerial object. A user interface displays the material identification results and facilitates system configuration.

16 Claims, 34 Drawing Sheets

RADAR SYSTEM FOR IDENTIFYING MATERIAL COMPOSITION OF AERIAL OBJECTS

BACKGROUND

Technical Field

The present disclosure relates to radar detection systems for non-invasive material identification within aerial objects using broadband white noise radar signals and artificial intelligence-based signal analysis.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Radar systems are electronic systems that detect the presence, location, and movement of objects by transmitting electromagnetic signals and analyzing the reflections received from those objects. They form the backbone of modern surveillance, navigation, air traffic control, remote sensing, and defense monitoring applications. A typical radar system consists of a transmitter that emits signals, a receiver that detects the reflected signals, and a signal processor that interprets the data to derive information such as object distance, speed, and trajectory.

Conventional radar systems primarily focus on determining the spatial parameters of objects. Such systems evaluate how the transmitted signals reflect off external surfaces and use this information to calculate range, bearing, and relative motion. While such systems perform reliably in object detection, they offer limited insight into the internal structure or material composition of the objects they detect.

When two aerial objects are identical in shape, size, and surface characteristics but contain different materials inside, conventional radar systems are typically unable to distinguish between them. This limitation significantly affects applications in security and defense, where the ability to detect hidden or hazardous materials inside aerial platforms is essential. As radar signals reflect similarly from external surfaces, the presence of different internal materials does not usually result in a discernible difference in the radar signature.

To address these limitations, certain enhancements have been introduced in radar technology. These technologies include the use of multiple frequencies, polarimetric analysis, high-resolution imaging, and synthetic aperture techniques. Such methods improve detection and imaging resolution, but they remain largely focused on external characterization. The methods also rely on narrowband or predefined frequency waveforms, which restrict the ability to generate diverse signal interactions required for material-specific analysis.

Artificial intelligence has recently been integrated into radar systems for improving performance in object classification, clutter removal, and trajectory prediction. These advancements have improved efficiency and accuracy in object tracking. However, AI-based radar applications have seldom been directed toward analyzing internal material content. The processing models often depend on fixed signal structures and do not extract complex material-related features from the radar reflections.

Radar systems that use narrowband signals further limit the amount of information extractable from reflected signals. These systems provide limited spectral diversity and reduce capacity of the system to detect unique signal modifications caused by different materials.

Accordingly, a need exists for a radar system that can accurately identify the internal material composition of aerial objects, especially when the objects have indistinguishable external characteristics. There is a further need for a system that transmits a broadband signal capable of producing rich interactions with various materials, and that uses artificial intelligence to analyze the resulting reflections and classify materials based on learned signal patterns.

SUMMARY

In an exemplary embodiment, a radar system for identifying material composition of itionally, the radar system supports objects is described. The radar system includes a transmitter configured to emit a white noise signal having a substantially flat power spectral density. The radar system includes a receiver to capture a reflected signal of the white noise signal reflected from an aerial object. The radar system includes a signal processor to filter the reflected signal and form a processed signal. The radar system includes an artificial intelligence processor configured to analyze the processed signal and identify a material composition of the aerial object based on a machine learning model. The radar system includes a user interface that displays material identification results and provides system configuration controls.

In another exemplary embodiment, a method for identifying a material composition of an aerial object is described. The method includes transmitting a white noise signal in a broadband signal comprising plurality of frequencies from a white noise radar transmitter. The method includes capturing, by a receiver, a reflected signal of the white noise signal reflected from the aerial object. The method includes processing the reflected signal by a signal processor to filter the reflected signal and form a processed signal. The method includes analyzing the processed signal by an artificial intelligence processor to identify a material composition of the aerial object based on a machine learning model. The method includes displaying material identification results on a user interface.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
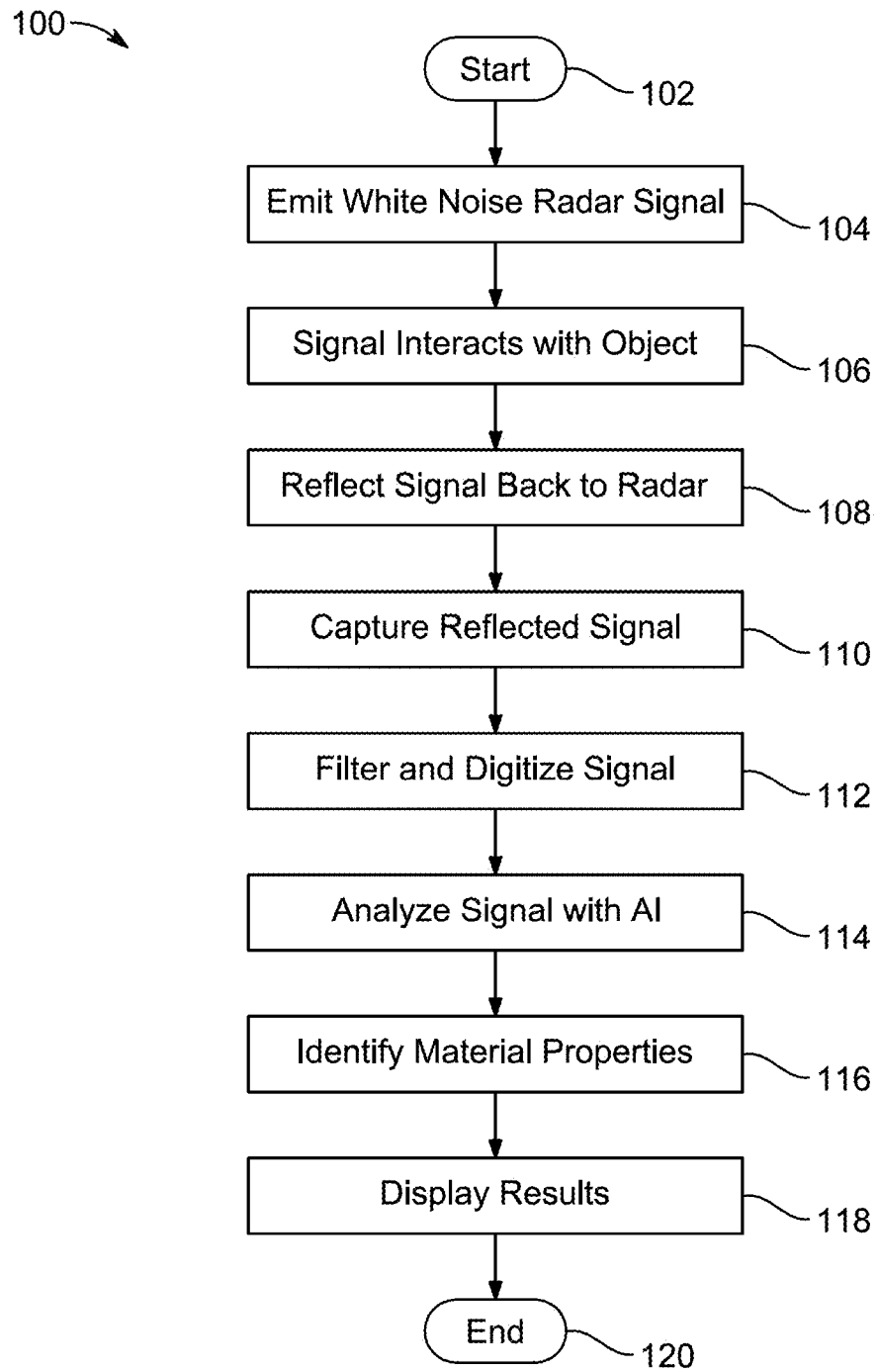
FIG. 1 illustrates an exemplary method for identifying material composition of an aerial object using a white noise radar signal and artificial intelligence-based classification, in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

For purposes of this disclosure, "aerial objects" encompass airborne vehicles, platforms, and structures capable of radar detection and material composition analysis. Aspects of this disclosure address the problem of material identification in aerial objects, where conventional radar systems are unable to distinguish between objects with similar external characteristics but different internal compositions. A radar system of the present disclosure employs a white noise radar transmitter in conjunction with an artificial intelligence processor to support precise identification of materials based on reflected signal characteristics. The system overcomes limitations of traditional narrowband radars by utilizing a broadband signal and applying machine learning to analyze material-dependent reflection patterns.

The radar system includes a transmitter configured to emit a white noise signal and a receiver that captures the signal reflected from an aerial object. A signal processor filters and digitizes the reflected signal, which is then analyzed by the artificial intelligence processor to determine the material composition based on a trained machine learning model. A user interface displays the identification results and provides configurable system controls.

Additionally, the radar system supports real-time monitoring and includes a data storage unit for maintaining reference reflection signatures. The integration of broadband white noise emission with AI-driven analysis provides accurate classification of materials inside aerial objects, thereby enhancing capabilities in security, surveillance, and aerospace applications.

FIG. 1 illustrates an exemplary method 100 for identifying the material composition of an aerial object using a white noise radar system integrated with artificial intelligence based analysis. The method 100 comprises a series of sequential steps that allow the system to detect and classify internal materials within an object, even when the object shares similar external dimensions and surface characteristics with other aerial objects.

At step 102, the radar system is initialized for operation. The radar system includes a radar transmitter, a radar receiver, a signal processor, an artificial intelligence processor, and a user interface. The system components may be integrated within a single portable housing or may be distributed depending on the deployment architecture.

At step 104, the radar transmitter emits a white noise signal toward the aerial object. The white noise signal refers to a broadband random signal that exhibits a substantially flat power spectral density across a wide frequency range, such as from 1 GHz to 40 within preferred sub-ranges within the 1 GHz to 40 GHz range. Within this broadband span, the system is designed to adaptively focus on nested sub-ranges based on application requirements and environmental constraints. These sub-ranges include, but are not limited to:

L-band: 1-2 GHz (useful for penetration through foliage or light obstructions)

S-band: 2-4 GHz (used in surveillance and weather radars)

C-band: 4-8 GHz (offers balance between resolution and penetration)

X-band: 8-12 GHz (used for high-resolution targeting and tracking)

Ku/K/Ka-bands: 12-40 GHz (for fine-grained material response differentiation).

The system dynamically selects or emphasizes particular sub-bands using software-defined radio (SDR) control and frequency hopping techniques, optimizing signal-to-noise ratio and material response fidelity in the reflected signal.

Contrary to conventional radar systems that operate at fixed or narrow frequency bands, the white noise signal provides wide spectral coverage, which enhances interaction with a broad variety of materials. The uniform distribution of power across the frequency band ensures that different materials interact with different portions of the spectrum, producing unique reflection characteristics based on intrinsic material properties such as density, permittivity, and structural composition.

At step 106, the emitted white noise signal propagates toward the aerial object and interacts with it. As the signal impinges on the object, each material component within the object reflects a different subset of frequencies, depending on its physical and electrical properties. For example, metallic components may reflect higher frequencies more strongly, while composite materials may exhibit frequency selective attenuation or scattering. These variations encode material specific information into the reflected signal.

At step 108, the signal modified by its interaction with the aerial object reflects back toward the radar system. The reflected signal now contains a mixture of amplitude and phase variations across multiple frequencies, each of which corresponds to how the internal materials of the object responded to the incident white noise.

At step 110, the radar receiver captures the reflected signal. The radar receiver may include a plurality of antenna elements spatially arranged to enhance signal acquisition and improve spatial diversity. The radar receiver is configured for robust signal collection even under low signal to noise ratio conditions or in complex electromagnetic environments. Features such as a low-noise amplifier (LNA) to minimize internal receiver noise to enhance weak signal detection, an adaptive gain controller (AGC) to dynamically adjust receiver sensitivity to maintain optimal signal levels, a digital beamformer to improve spatial resolution and signal directionality, thereby reducing interference from surrounding noise, a high-dynamic range controller (ADC) to preserve signal integrity even under high-noise or fluctuating signal conditions, and a real-time noise filtering with algorithms to suppress environmental and electronic clutter using advanced digital signal processing.

At step 112, the captured signal is processed by the signal processor. The signal processor filters out unwanted noise, isolates frequency components relevant to material characterization, and converts the analog signal into a digital format suitable for further analysis. The signal processor may also implement algorithms that differentiate between signal reflections originating from the external surface of the object and those that result from internal material composition.

At step 114, the artificial intelligence processor receives the processed signal for analysis. The artificial intelligence processor includes one or more machine learning models that have been trained on a dataset comprising known material reflection patterns. The processor computes a material reflection feature vector by considering the amplitude of the reflected signal, the distance between the radar system and the aerial object, and the respective gain values of the transmitter and the receiver. The computed features are compared against stored reference signatures corresponding to known materials.

At step 116, the artificial intelligence processor identifies the material composition of the aerial object by applying one or more classification algorithms. Classification algorithms for radar signal interpretation and material differentiation are preferred. Specifically, the system may utilize a convolutional neural network (CNN) to extract spatial and frequency-domain features from reflected signal patterns, a support vector machine (SVMs) for high-accuracy binary or multiclass classification of material types based on preprocessed feature sets, a random forest (RF) for ensemble learning and decision-making based on multiple radar signal parameters.

The models are preferably trained on labeled radar reflection datasets corresponding to known materials (e.g., metal, plastic, sand, explosives), permitting the AI processor to accurately determine the material composition of aerial objects in real time.

The comparison process determines which known material pattern most closely resembles the features observed in the current signal. The artificial intelligence processor may support identification of a wide range of materials, including metals, composites, plastics, ceramics, and hazardous substances.

At step 118, the user interface displays the identified material composition along with a confidence score indicating the reliability of the classification result. The user interface also allows an operator to adjust system parameters such as detection sensitivity, signal power level, material classification thresholds, and scanning range. These adjustments may be based on operational requirements or environmental conditions.

At step 120, the method concludes upon successful completion of material identification and output display. The resulting information supports decision making in real time surveillance, threat assessment, aerospace diagnostics, and similar applications.

Figure 2:
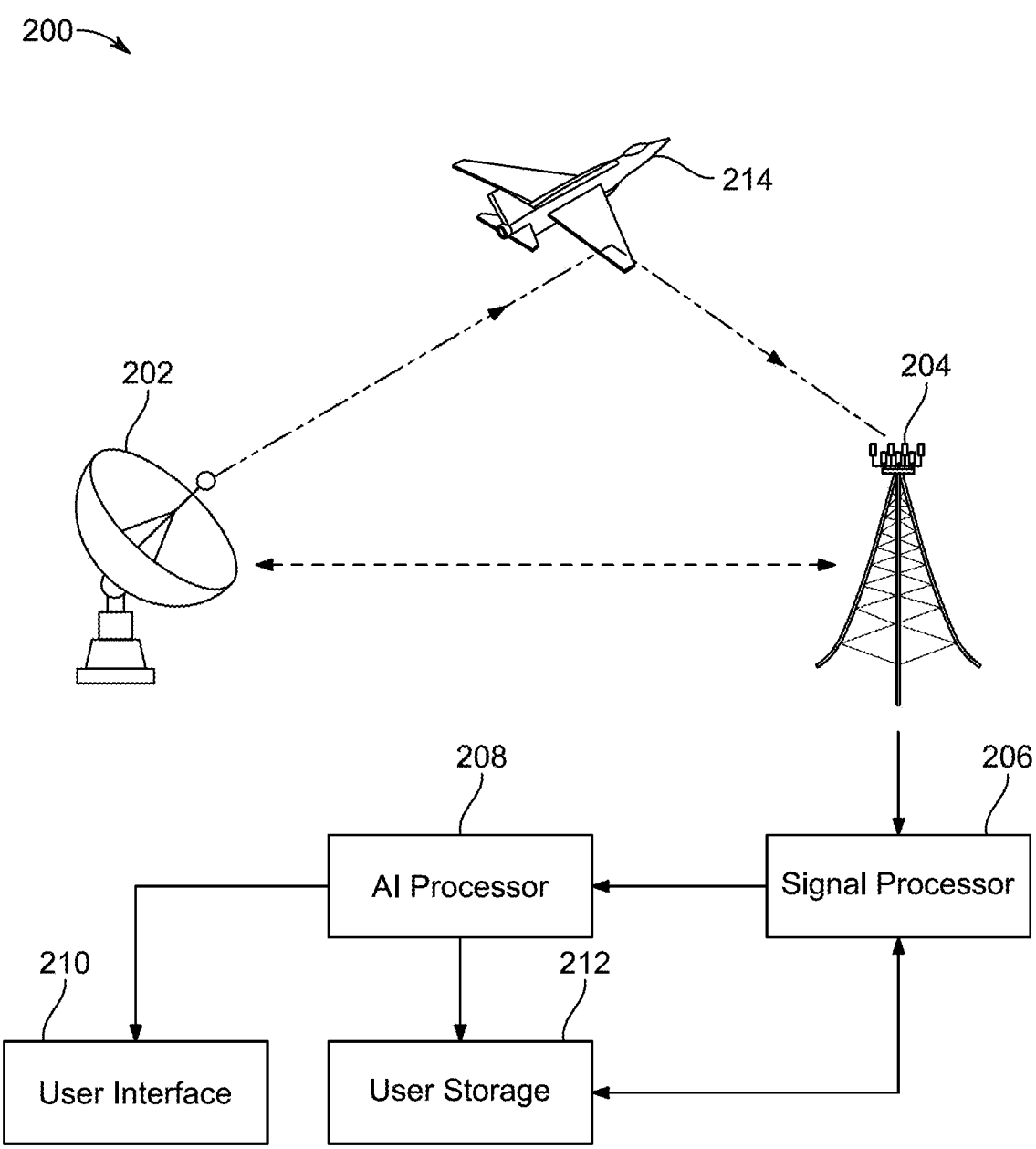
FIG. 2 illustrates an exemplary system architecture of a radar system configured to identify the material composition of aerial objects, in accordance with an exemplary aspect of the disclosure.

FIG. 2 illustrates an exemplary system architecture of a radar system 200 configured to identify material composition of aerial objects by using a white noise radar signal and artificial intelligence based signal analysis. The radar system 200 comprises a radar transmitter 202, a radar receiver 204, a signal processor 206, an artificial intelligence processor 208, a user interface 210, and a data storage unit 212. Each component is operatively coupled to adjacent components and configured to function in a sequential manner to provide real-time and non-invasive material identification based on signal reflections from the aerial object.

The radar transmitter 202 is configured for emitting a white noise signal toward a target aerial object. The white noise signal comprises a broadband random waveform characterized by a substantially flat power spectral density, typically ranging from 1 GHz to 40 GHz. This broadband emission allows interaction across a wide frequency spectrum, enabling frequency-specific reflection patterns to form based on the material properties of the object. The transmitter 202 is electrically and functionally connected to the radar receiver 204, establishing a transmission and reception loop centered on the aerial object under inspection.

The radar receiver 204 is positioned to capture the white noise signal after it reflects off the aerial object. The radar receiver 204 may include a plurality of spatially distributed antenna elements configured to collect the returning signal from various angles and propagation paths. The captured reflected signal includes frequency, amplitude, and phase distortions introduced by internal components of the aerial object. Because the radar receiver 204 is tuned to the spectral characteristics of the emitted white noise, and is capable of preserving signal features critical to subsequent material analysis. The output of the radar receiver 204 is electrically transmitted to the signal processor 206 for conditioning and conversion.

The signal processor 206 receives the analog reflected signal from the radar receiver 204 and performs filtering and digitization operations. Filtering circuits isolate relevant frequency components that contribute to material-specific reflection patterns while attenuating noise and interference. Analog-to-digital conversion modules transform the filtered signal into a digital format suitable for algorithmic processing. Additionally, the signal processor 206 may implement logic to differentiate between reflections from the object's surface and reflections originating from its internal structure. This preprocessing stage provides enhanced interpretability of the signal before further analysis by the artificial intelligence processor 208.

The artificial intelligence processor 208 is electrically connected to the signal processor 206 and receives the processed signal for classification. The artificial intelligence processor 208 is configured to apply a machine learning model trained on a database of known material reflection signatures. The processor computes a material reflection feature vector using parameters such as signal amplitude, range to the aerial object, transmitter gain, and receiver gain. These features are compared against a reference library to identify the most likely material composition present within the object. The artificial intelligence processor 208 may utilize graphical processing units or other hardware accelerators to support efficient computation and classification under real-time constraints. The artificial intelligence processor applies machine learning algorithms trained on material signature databases to recognize frequency response patterns specific to different materials.

Following the material classification, the artificial intelligence processor 208 transmits the results to the user interface 210. The user interface 210 displays the identified material composition, along with associated metadata such as confidence scores, signal quality metrics, and detection conditions. The user interface 210 also serves as a control portal, allowing an operator to adjust system configuration parameters including detection sensitivity, white noise transmission power, identification thresholds, and scanning coverage. Through this bidirectional interaction, the user may adapt the system's performance to suit operational requirements.

Simultaneously, the artificial intelligence processor 208 stores the processed signal data, classification outputs, and comparison metrics in the data storage unit 212. The data storage unit 212 is directly connected to both the artificial intelligence processor 208 and the user interface 210. It maintains a persistent repository of raw signal logs, material identification results, machine learning models, and historical classifications. The stored data may be used for offline analysis, retraining of models, or cloud-based synchronization depending on system configuration. The data storage unit 212 supports long-term operational continuity and model refinement over time.

Figure 3:
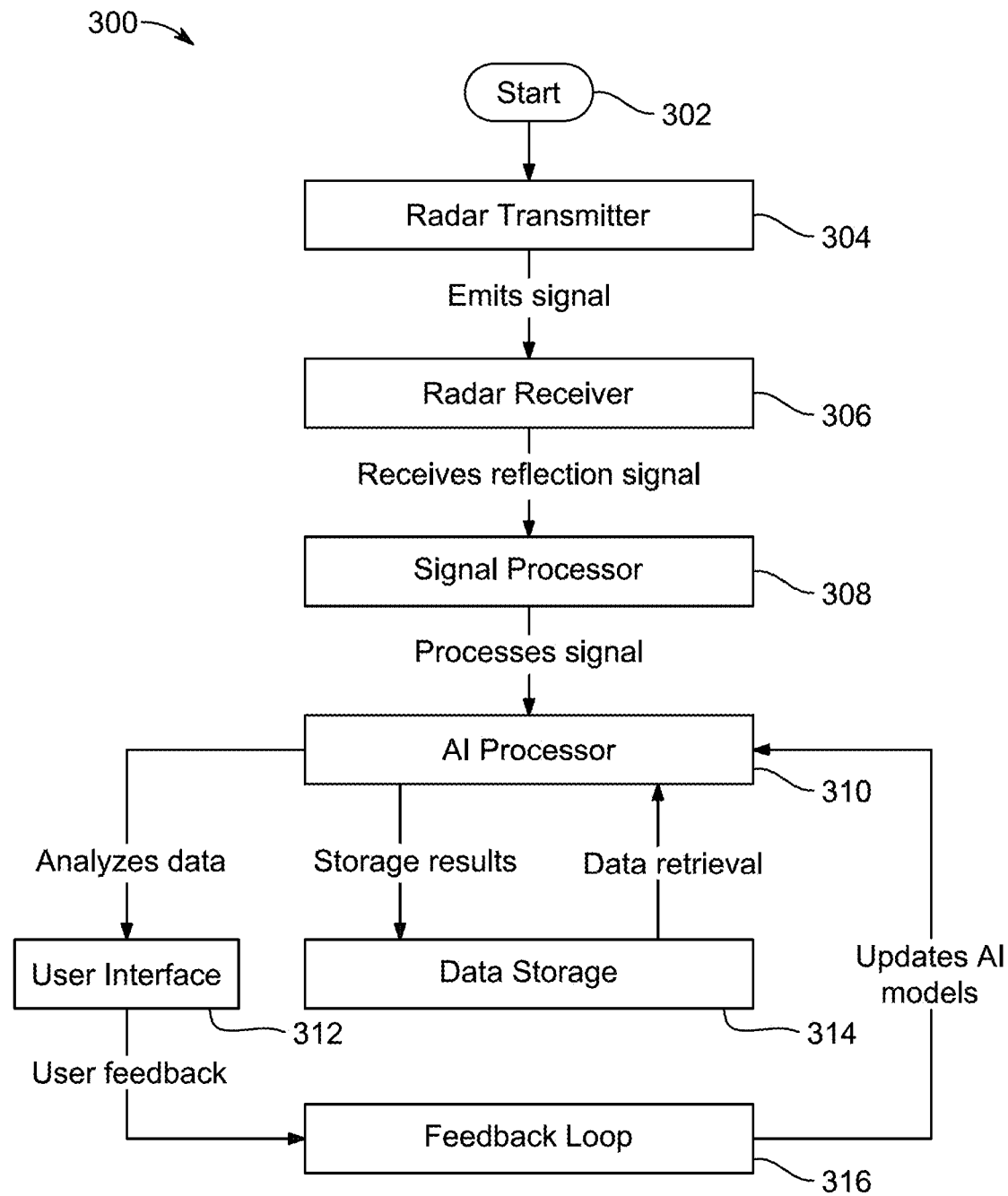
FIG. 3 illustrates a system architecture flow depicting sequential operations, in accordance with an exemplary aspect of the disclosure.

FIG. 3 illustrates a system architecture flow 300 for a radar system configured to identify material composition of aerial objects using a white noise radar signal and artificial intelligence based signal analysis.

At step 302, the radar system is initialized. Initialization may involve powering up system hardware, loading predefined configuration parameters, and establishing communication channels among subsystems. Upon initialization, the radar transmitter 304 is activated to begin signal emission.

In step 304, the radar transmitter emits a white noise radar signal. The signal consists of a broadband random waveform with a substantially flat power spectral density over a defined frequency spectrum. Emission of such a wideband signal facilitates comprehensive interaction with various materials in the target aerial object, allowing for frequency dependent reflection and absorption.

The emitted signal propagates through space and interacts with the aerial object under investigation. At step 306, the radar receiver receives the reflected signal. The radar receiver is configured with one or more antenna elements to capture the return signal after interaction with the object. The captured signal includes changes in amplitude, phase, and spectral distribution that vary based on the internal material composition of the object.

At step 308, the signal processor receives the analog reflected signal from the radar receiver. The signal processor filters and digitizes the received waveform. Filtering modules remove noise and irrelevant spectral components while preserving material-relevant information. Analog to digital conversion units then convert the cleaned analog signal into a digital format suitable for computational processing. Additionally, the signal processor may perform operations to distinguish reflections from the object surface versus its internal materials, which contributes to more accurate downstream analysis.

The digital output of the signal processor is delivered to the artificial intelligence processor, at step 310. The artificial intelligence processor applies one or more trained machine learning models to analyze the processed signal and identify the material composition of the aerial object. The artificial intelligence processor computes material reflection features based on multiple parameters, including signal amplitude, distance to the object, transmitter gain, and receiver gain. These features are then matched against a reference library of known material signatures. The artificial intelligence processor performs classification by comparing the processed signal to stored patterns and generates output results reflecting identified material types and associated confidence metrics.

The classification output is directed to both the user interface 312 and the data storage 314. The user interface displays identified materials, confidence scores, and classification metadata. The user interface allows operators to monitor system performance, configure operational settings such as detection sensitivity and scanning range, and submit feedback on analysis results. Feedback may include user validation of classification accuracy or corrections when misclassification occurs.

Concurrently, the artificial intelligence processor stores all processed data, intermediate features, and classification results in the data storage, at step 314. The data storage comprises non-volatile memory capable of maintaining reference reflection signatures, historical classification records, and trained machine learning models. The artificial intelligence processor may retrieve data from the data storage for model comparison or retraining operations.

At step 316, a feedback loop component is engaged. The feedback loop collects user feedback from the user interface and analysis outcomes from the data storage. Based on this information, the artificial intelligence processor retrains or updates its machine learning models to incorporate new material types or improve classification performance. For example, if the system consistently misclassifies a particular composite material, the updated model will learn to distinguish its signature more accurately in future instances.

Figure 4:
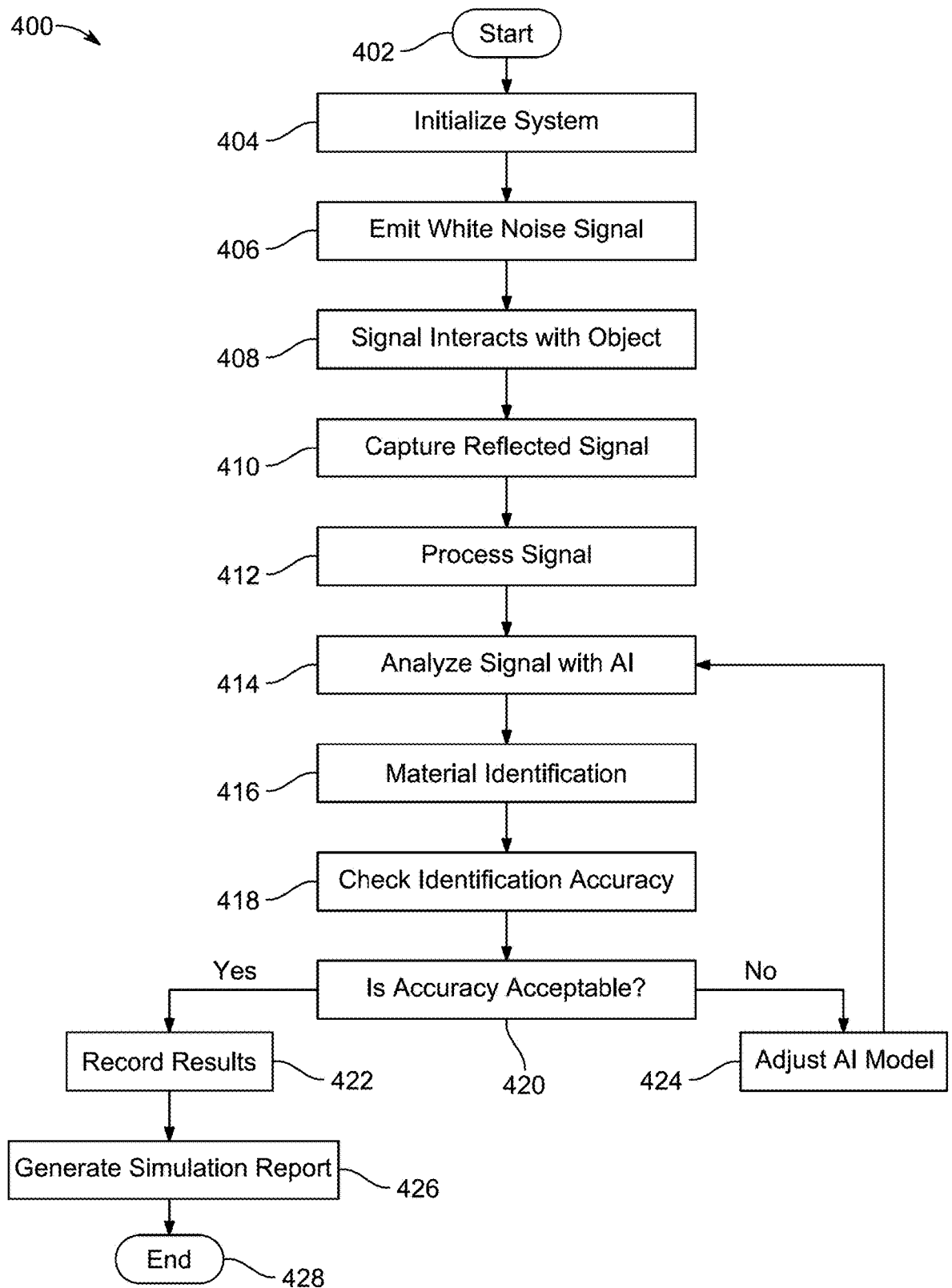
FIG. 4 illustrates a detection simulation method used to assess identification accuracy and retrain artificial intelligence, in accordance with an exemplary aspect of the disclosure.

FIG. 4 illustrates a system detection method 400 implemented to simulate and evaluate the performance of a radar system configured for material identification in aerial objects using a white noise radar signal and artificial intelligence based analysis. The method 400 provides a structured framework to assess the identification accuracy of the radar system under a variety of controlled conditions, thereby enabling performance benchmarking and adaptive model refinement.

At step 402, the overall process is initiated. At step 404, the system components are initialized. The initialization of the system components includes activating the radar transmitter, configuring the radar receiver, powering the signal processor, and loading the artificial intelligence models into the processing environment. Initialization also involves setting the simulation environment parameters such as object type, location, material composition, and orientation.

Once initialized, the radar transmitter emits a white noise signal at step 406. The white noise signal comprises a broadband spectrum with substantially flat power distribution, allowing for frequency specific interaction with a range of materials. The emitted signal propagates toward the simulated aerial object.

At step 408, the signal interacts with the aerial object. The interaction modifies the signal based on material characteristics such as density, conductivity, and structural composition. The reflected signal contains frequency-dependent variations that serve as unique identifiers of the material properties within the object.

At step 410, the radar receiver captures the reflected signal. The receiver records both primary and secondary reflections resulting from internal and surface-level interactions. The captured signal includes amplitude shifts, phase delays, and spectral distortions caused by the internal materials of the aerial object.

The captured analog signal is delivered to the signal processor, at step 412. The signal processor performs filtering to remove noise and irrelevant components, followed by analog to digital conversion to prepare the signal for artificial intelligence analysis. The digitized signal retains the critical material specific features required for classification.

At step 414, the artificial intelligence processor analyzes the digitized signal. A trained machine learning model processes the signal to extract a feature vector. The processor compares the vector to a predefined library of reference signatures that correspond to known materials. The result of this comparison yields a material classification decision.

The identified material is output at step 416. At this stage, the artificial intelligence processor concludes the classification and outputs a predicted material label based on the closest match in the reference dataset. This result is passed to the next stage for accuracy evaluation.

In step 418, the system checks the accuracy of the material identification. The classification result is compared against a known ground truth defined within the simulation parameters. Such classification validates whether the artificial intelligence model has produced a correct result.

A decision node is reached at step 420, where the system evaluates whether the identification accuracy meets an acceptable threshold. If the accuracy is deemed acceptable, the process proceeds to step 422, where the results are recorded. The data recorded may include the predicted material, confidence score, and comparison metrics.

Following the recording of results, the simulation process generates a report at step 426. The report documents the performance of the system under the given simulation conditions, including statistical summaries of accuracy, false detection rates, processing time, and model confidence. The report may serve as evidence of system readiness for deployment or provide input for regulatory or development review.

The process then concludes at step 428.

If the system determines that the identification accuracy does not meet the predefined threshold at step 420, the artificial intelligence model is adjusted at step 424. Adjustments may involve retraining the model using additional training data, modifying classification parameters, or applying data augmentation techniques. The adjusted model is then re-evaluated beginning again from the analysis step 414, forming a closed-loop system for continuous learning and performance optimization.

Figure 5:
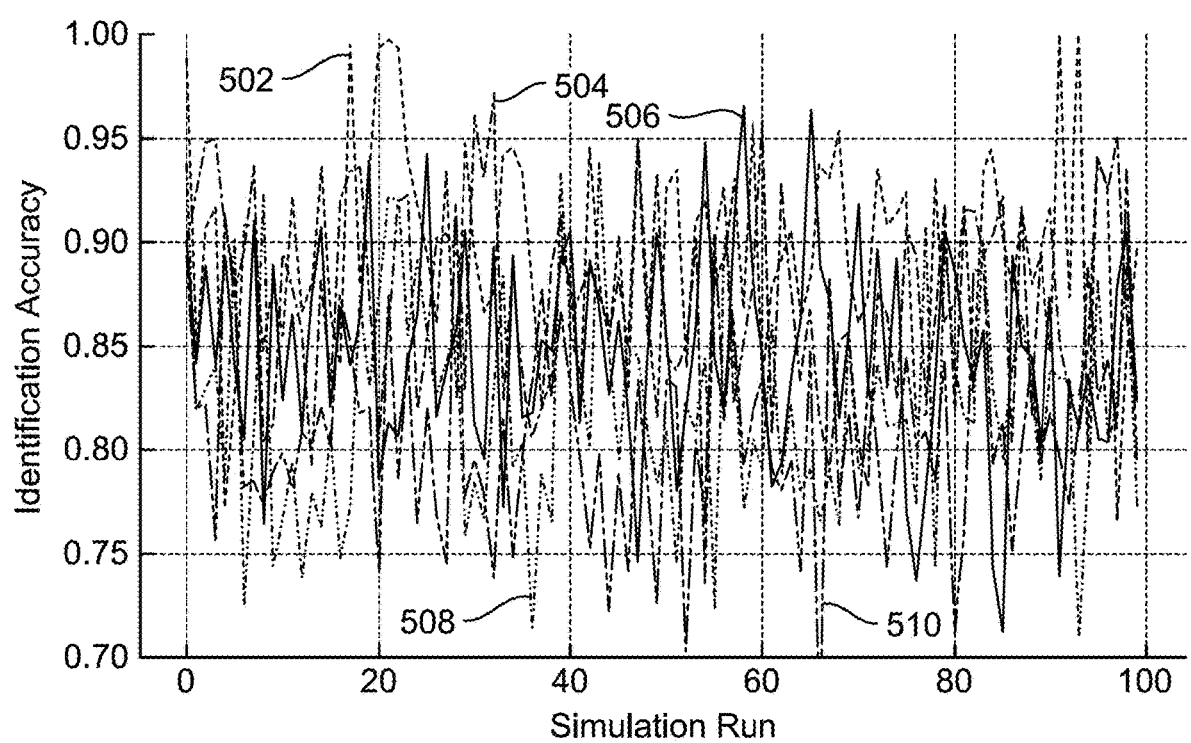
FIG. 5 illustrates a simulation output graph representing material identification accuracy achieved by the radar system, in accordance with an exemplary aspect of the disclosure.

FIG. 5 illustrates a simulation output graph that presents the material identification accuracy achieved by the radar system utilizing white noise signal emission and artificial intelligence based signal analysis. The graph captures the accuracy trends for five different material categories across one hundred simulation runs, conducted under controlled virtual testing environments.

The y-axis of the graph represents identification accuracy on a scale from 0.70 to 1.00, while the x-axis represents the simulation run index, ranging from 1 to 100. Each curve in the graph corresponds to a specific material category, such as metal 502, plastic 504, explosives 506, organic compounds 508, and electronics 510. The curves track the system's performance in identifying each material category during repeated runs, with each run simulating varying object orientations, material compositions, and environmental conditions.

The system achieved the highest average accuracy for metal classification, recorded at 0.89 across all simulation runs. The accuracy for plastic identification followed closely at an average of 0.87. For explosives, the system recorded an average accuracy of 0.85, while organic compounds were identified with an average accuracy of 0.82. The electronics category showed slightly lower performance with an average identification accuracy of 0.81. Despite minor variations across runs, the accuracy levels remained above 0.80 for all material categories, indicating consistent and reliable performance of the artificial intelligence model in recognizing frequency reflection patterns associated with different material types.

The artificial intelligence model used in the simulation was trained on a dataset comprising reference signatures for each material class. During each simulation run, a virtual object composed of one or more materials was exposed to a white noise radar signal. The reflected signal, as shaped by material-specific dielectric and structural properties, was captured, digitized, and processed. The processed signals were analyzed by the artificial intelligence processor, which classified the materials by matching the reflection pattern with known material signatures.

This simulation result graph was generated as part of a broader performance evaluation campaign that aimed to validate the classification capability of the radar system in realistic operational scenarios. The evaluation accounted for potential signal distortions, overlaps in spectral characteristics, and near-similar physical properties across materials. Ability of the system that exceeds accuracy above 95% in scenarios involving distinct materials and maintains accuracy above 85% in scenarios with materials having similar dielectric properties demonstrates the robustness of the white noise radar approach in conjunction with machine learning based classification.

The trends observed in FIG. 5 also informed refinement of the artificial intelligence models used for classification. In instances where material identification accuracy showed higher variance or lower precision, model parameters were adjusted and retraining procedures were invoked to enhance discrimination capability. For example, classification improvements for organic compounds and electronics were achieved by incorporating additional training samples and increasing the resolution of feature extraction in signal preprocessing.

Figure 6:
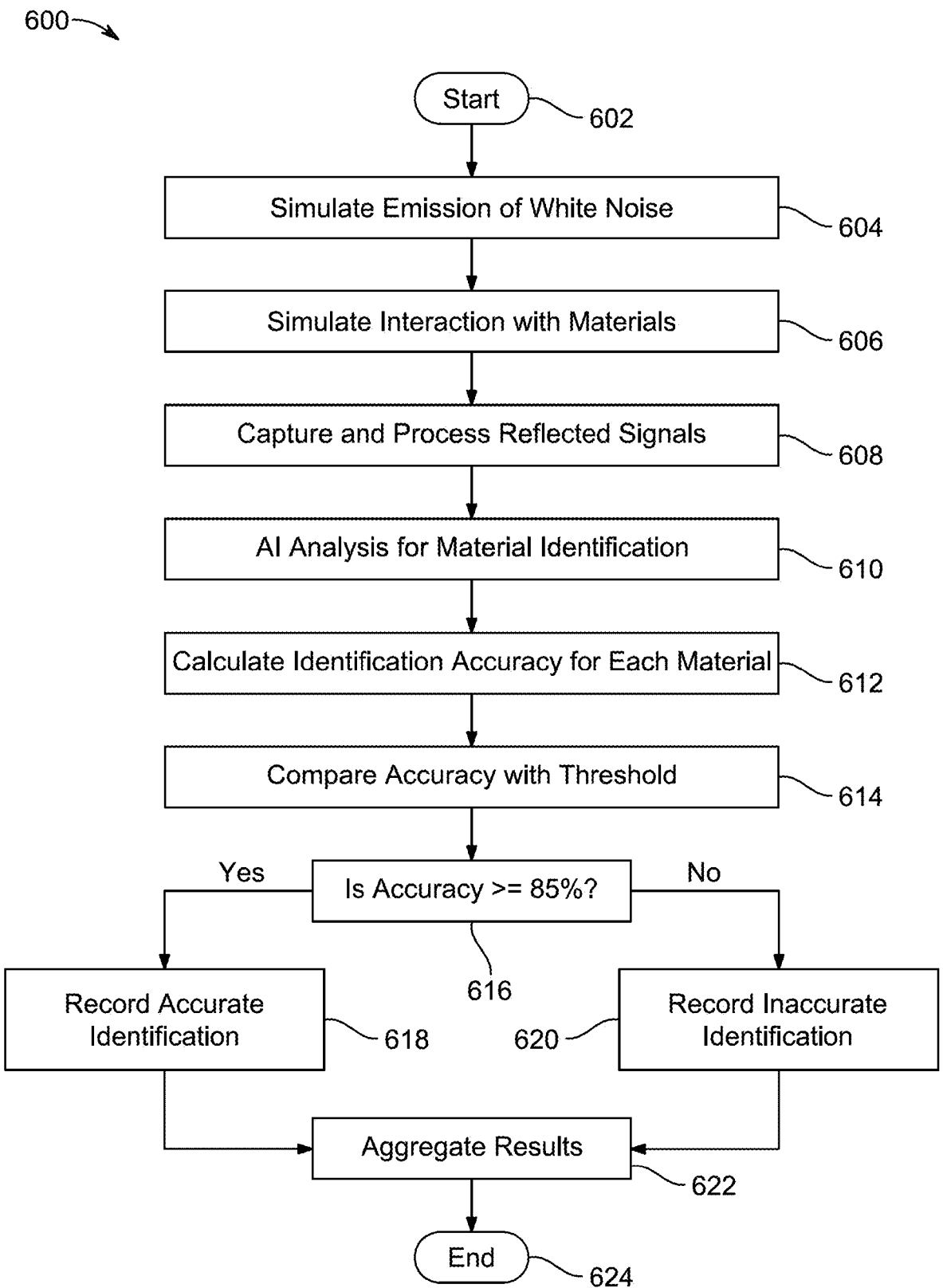
FIG. 6 illustrates a simulation method for evaluating classification accuracy of the radar system, in accordance with an exemplary aspect of the disclosure.

FIG. 6 illustrates a simulation method 600 for evaluating material identification accuracy using a radar system that emits a white noise signal and performs artificial intelligence based classification. The method is implemented to determine whether the system accurately identifies materials embedded within an aerial object under simulated conditions.

At step 602, the simulation environment is initialized, and relevant parameters are loaded. These parameters may include definitions of the material categories, characteristics of the radar signal, and the configuration of the artificial intelligence processor.

At step 604, the simulation generates a white noise signal intended to simulate the emission from a radar transmitter. The white noise signal spans a broad spectral range with a substantially uniform power spectral density across the frequency domain. The system directs this simulated radar signal toward a virtual object modeled to contain different internal materials.

At step 606, the simulation models the interaction between the emitted radar signal and the object's internal materials. Each material, such as metal, plastic, explosives, organic compounds, or electronics, modifies the radar signal in a unique manner based on its dielectric and reflective properties. These modifications are essential for generating material-specific signal patterns.

At step 608, the reflected signal is captured and digitally processed. The simulation includes filtering modules that remove background interference and analog-to-digital conversion routines that transform the analog signal into a digital representation suitable for algorithmic analysis.

At step 610, the artificial intelligence processor analyzes the digitized signal to identify material composition. The processor compares extracted features against a reference dataset of known material signatures using machine learning classification models. The analysis yields a predicted material type for each simulated instance.

At step 612, the system calculates the identification accuracy for the material under evaluation. Accuracy is determined by comparing the predicted classification against the ground truth assigned during simulation setup. This comparison yields a numeric accuracy score representing the performance of the classification model for that simulation run.

At step 614, the system compares the calculated accuracy with a predefined threshold. In the present embodiment, the threshold is set at 85 percent. This value represents the minimum acceptable level of classification confidence for the result to be recorded as accurate.

At step 616, a decision is made regarding whether the classification accuracy satisfies the threshold requirement. If the accuracy is greater than or equal to 85 percent, the system proceeds to step 618 to record the result as an accurate identification. If the accuracy falls below the threshold, the system proceeds to step 620 to record the result as an inaccurate identification.

At step 622, the simulation aggregates all recorded results from multiple runs. This aggregation includes both accurate and inaccurate classifications, and serves as a statistical basis for computing performance metrics such as average accuracy, standard deviation, and material-wise consistency.

At step 624, the simulation concludes. The aggregated results are prepared for reporting, review, and potential model refinement. This process supports ongoing assessment of the radar system's capability to perform material identification in aerial objects using stochastic signal interaction and data-driven classification models.

Figure 7:
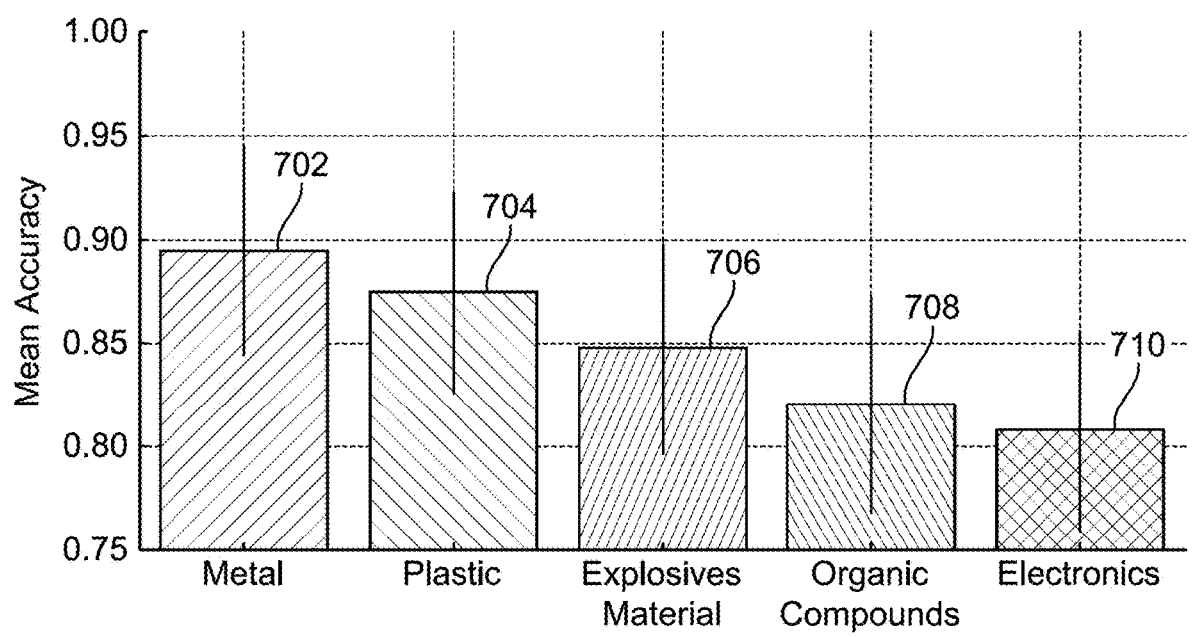
FIG. 7 illustrates a bar plot displaying the mean identification accuracy and standard deviation for each material type classified by the AI-enhanced radar system, in accordance with an exemplary aspect of the disclosure.

FIG. 7 illustrates a bar plot representing the mean identification accuracy with standard deviation for each material type detected by the AI-enhanced white noise radar system for material identification in aerial objects. This visualization complements the simulation results discussed earlier and provides a statistical overview of how consistently the radar system performs across various material categories.

Bar 702 represents mean identification accuracy with standard deviation for metal, which exhibits the highest mean identification accuracy among the tested materials. The plot shows that the average accuracy for metal remains close to 0.89 with relatively low variability. This high accuracy and stability indicate the effectiveness of the AI algorithms in recognizing the signal reflection patterns that characterize metallic materials. In practice, this outcome may be attributed to the distinct electromagnetic reflection properties of metals, which produce stronger and more consistent signal responses within the white noise radar spectrum.

Bar 704 represents mean identification accuracy with standard deviation for plastic materials, which display a mean accuracy close to 0.87. Although slightly lower than that of metals, this result demonstrates that the radar system is capable of reliably distinguishing plastics based on their signal signatures. However, the standard deviation is wider than that of metal, indicating occasional inconsistencies, likely due to the variation in dielectric constants among different plastic types.

Bar 706 represents mean identification accuracy with standard deviation for explosives, showing a mean identification accuracy near 0.85. Given the critical importance of accurately detecting such materials in security applications, this performance indicates that the radar system maintains adequate sensitivity for identifying explosives, even under conditions of signal overlap or when multiple material types are present.

Bar 708 represents mean identification accuracy with standard deviation for organic compounds, which demonstrate a lower mean identification accuracy of approximately 0.82. The error bars are relatively longer, indicating a broader range of performance outcomes. This variability reflects the complex structural properties and inconsistent dielectric responses of organic compounds when exposed to white noise signals.

Bar 710 represents mean identification accuracy with standard deviation for electronics, showing the lowest mean identification accuracy in the evaluated group at approximately 0.81. Despite the lower average, the radar system remains capable of identifying electronics above the 0.75 threshold. The wide standard deviation indicates that the performance fluctuates depending on the composition and housing of the electronic components involved. Shielded electronics or overlapping signal reflections may contribute to identification challenges in certain simulation runs.

FIG. 8 comprises a series of histograms with corresponding kernel density estimation (KDE) curves that collectively depict the distribution of identification accuracy values for different materials across multiple simulation runs, as analyzed using the AI-Enhanced White Noise Radar System. Each sub-figure visualizes how consistently the system performs for a specific material category under controlled simulation conditions.

Figure 8A:
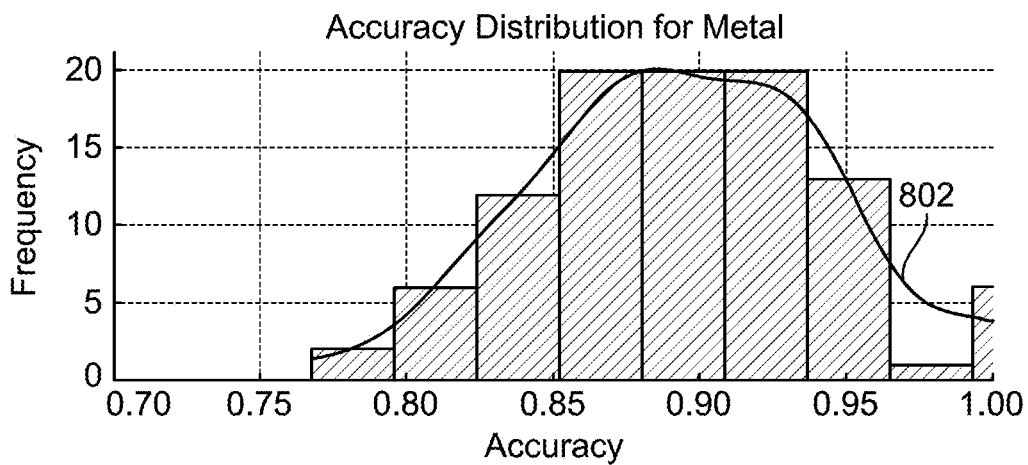
FIG. 8A illustrates a histogram with a kernel density estimation curve showing the distribution of identification accuracy for metallic materials, in accordance with an exemplary aspect of the disclosure.

FIG. 8A includes a histogram that shows the distribution of identification accuracy for metal. The KDE curve 802 represents a smooth estimation of the underlying probability density, indicating a peak around the 0.90 accuracy range. The distribution reflects a high level of consistency and reliability in detecting metallic substances, with most simulation outcomes concentrated between 0.85 and 0.95. The narrow spread indicates a strong and uniform radar response for metallic targets.

Figure 8B:
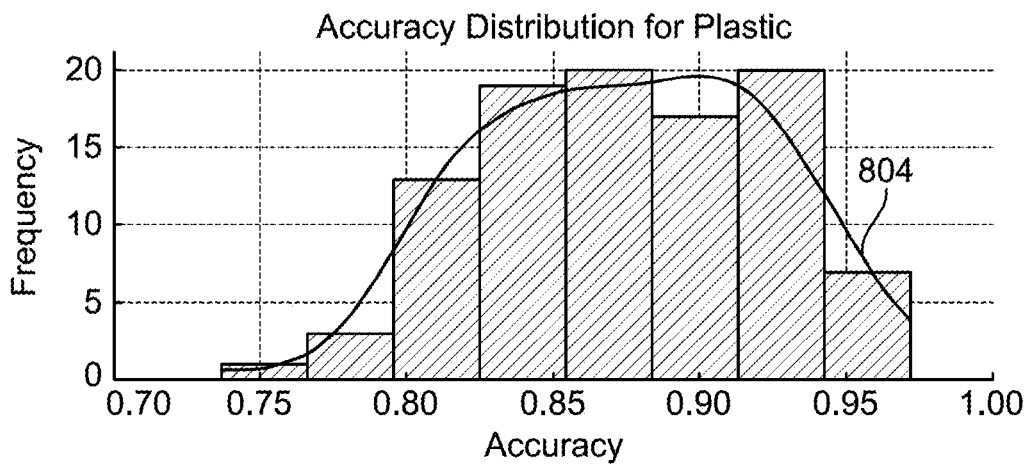
FIG. 8B illustrates a histogram with a kernel density estimation curve showing the distribution of identification accuracy for plastic materials, in accordance with an exemplary aspect of the disclosure.

FIG. 8B depicts the accuracy distribution for plastic. The histogram is centered around 0.87, and the KDE curve 804 shows a relatively normal distribution of identification accuracy values. The consistent shape of the curve implies that the radar system maintains reliable detection performance for plastic materials, despite some moderate variability due to differences in plastic compositions or surface properties.

Figure 8C:
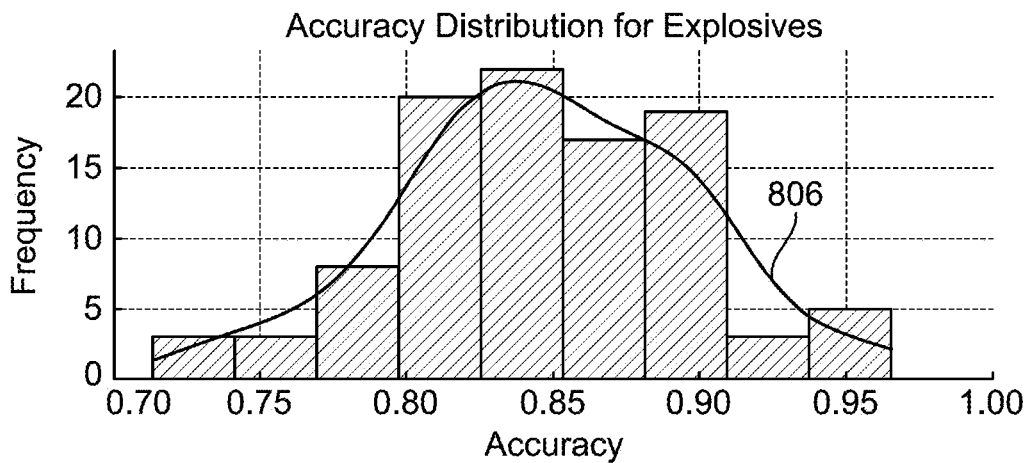
FIG. 8C illustrates a histogram with a kernel density estimation curve showing the distribution of identification accuracy for explosive materials, in accordance with an exemplary aspect of the disclosure.

FIG. 8C illustrates the distribution of identification accuracy for explosives. The histogram shows frequent occurrences of accuracy values near 0.85. Curve 806 indicates that although the identification of explosives remains largely accurate, there is measurable variability which may arise from differences in the structural and dielectric characteristics of various explosive compounds.

Figure 8D:
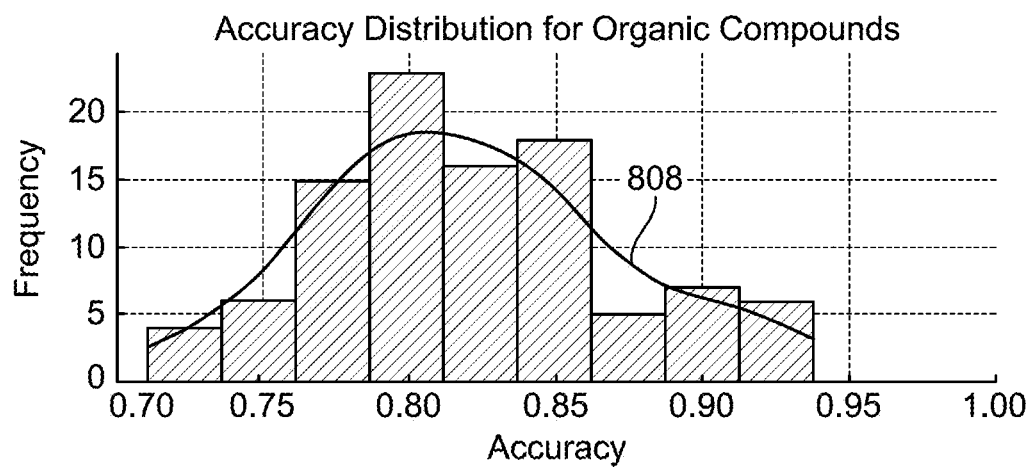
FIG. 8D illustrates a histogram with a kernel density estimation curve showing the distribution of identification accuracy for organic materials, in accordance with an exemplary aspect of the disclosure.

FIG. 8D presents the distribution of accuracy values for organic compounds. The histogram displays a wider spread across the 0.75 to 0.90 range, and KDE curve 808 reflects this variability through a flattened density profile. The KDE curve 808 indicates that identification of organic materials is less consistent than other categories, possibly due to the complex and diverse material properties of organic matter which lead to more diffuse radar signal reflections.

Figure 8E:
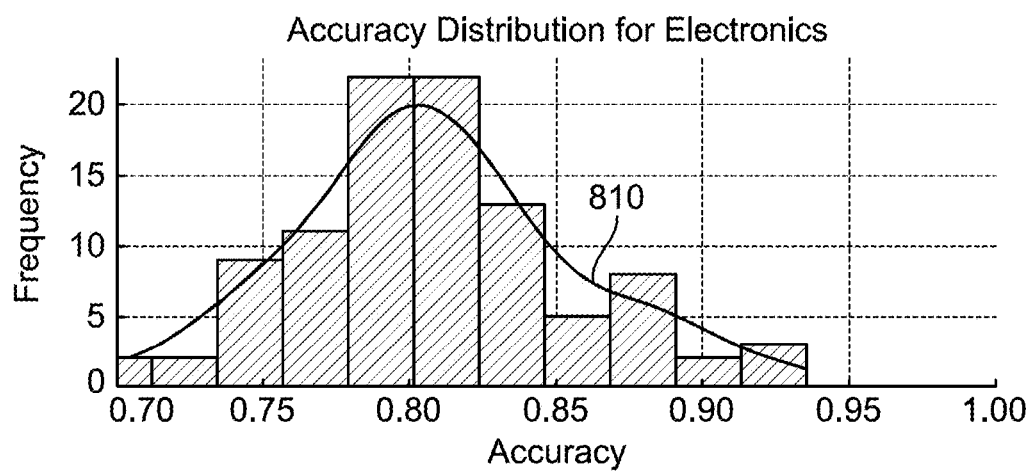
FIG. 8E illustrates a histogram with a kernel density estimation curve showing the distribution of identification accuracy for electronic materials, in accordance with an exemplary aspect of the disclosure.

FIG. 8E shows the identification accuracy distribution for electronics. The histogram reveals a concentration around 0.80, and KDE curve 810 captures this with a left-skewed profile that includes a noticeable tail extending toward lower accuracy values. The distribution pattern indicates that some electronic components may produce overlapping or ambiguous radar signatures, presenting a challenge for precise classification by the AI model.

Figure 9:
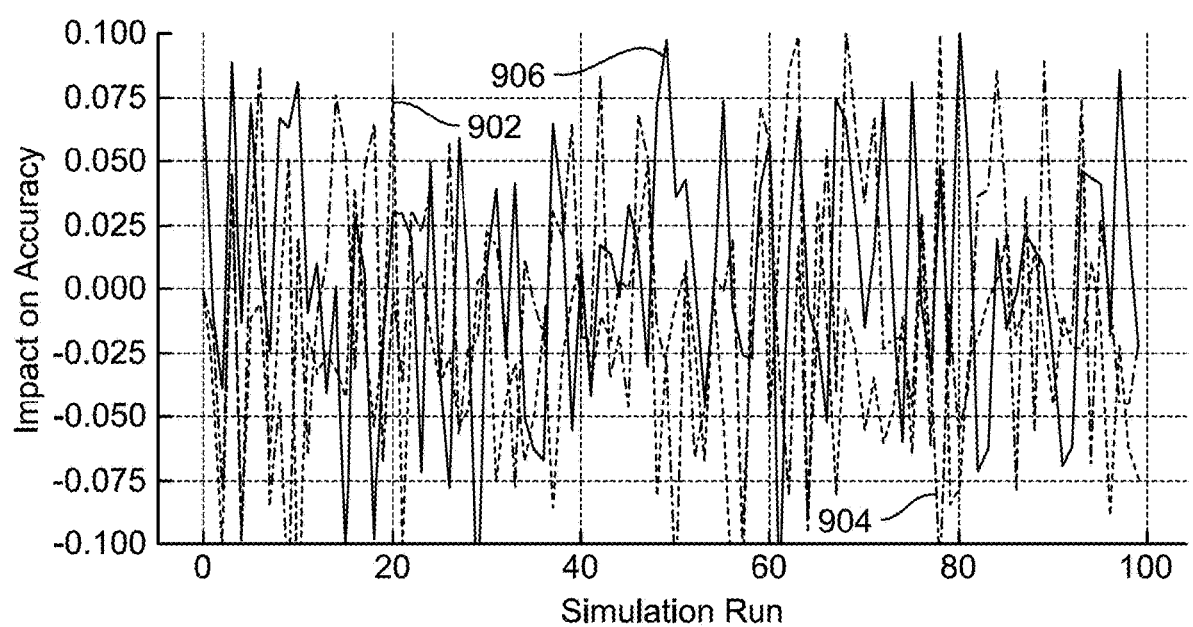
FIG. 9 illustrates a simulation graph showing the effect of different signal interference levels on classification accuracy of the radar system, in accordance with an exemplary aspect of the disclosure.

FIG. 9 illustrates a simulation plot 902 depicting the performance of the AI-Enhanced White Noise Radar System under varying levels of signal interference. The graph captures the impact of low interference 904, medium interference 906, and high interference 908 conditions on material identification accuracy across 100 simulation runs.

To replicate real-world operational conditions, the system was evaluated against multiple interference scenarios, including atmospheric disturbances, electromagnetic noise, and concurrent radar signals from nearby systems. These scenarios were intentionally introduced to assess how resilient the radar system remains when external noise sources influence the reflected signal integrity.

The radar system includes advanced signal processing logic embedded within a signal processor and an AI processor. The signal processor and the AI processor are configured to filter out non-informative noise artifacts and preserve critical signal features necessary for accurate material classification. The results of such processing are quantified by the extent to which signal interference alters identification accuracy.

As observed in the plotted lines, low interference scenarios exhibit minimal deviation in accuracy, with an average impact of approximately −0.02, indicating that the white noise radar system maintains reliable performance with slight degradation. The medium interference line fluctuates around an average impact of 0.00, demonstrating strong resistance to moderate disturbances. In contrast, the high interference condition shows an average positive impact of approximately 0.01, which may correspond to incidental reinforcement of material-specific features due to interference-induced spectral variations.

These simulation results assess the robustness of the radar architecture. The radar receiver, when coupled with the signal processor and AI processor, maintains a stable performance envelope even under adverse signal environments. This robustness contributes to consistent material identification outcomes. The robustness of the system against signal interference further underscores the value of the white noise radar transmission scheme. Unlike conventional narrowband radar systems, which are more susceptible to degradation in the presence of interference at specific frequencies, the broadband nature of the white noise signal diffuses the risk of localized disruption. As a result, the material-identifying features embedded in the signal are less likely to be lost or corrupted.

Figure 10:
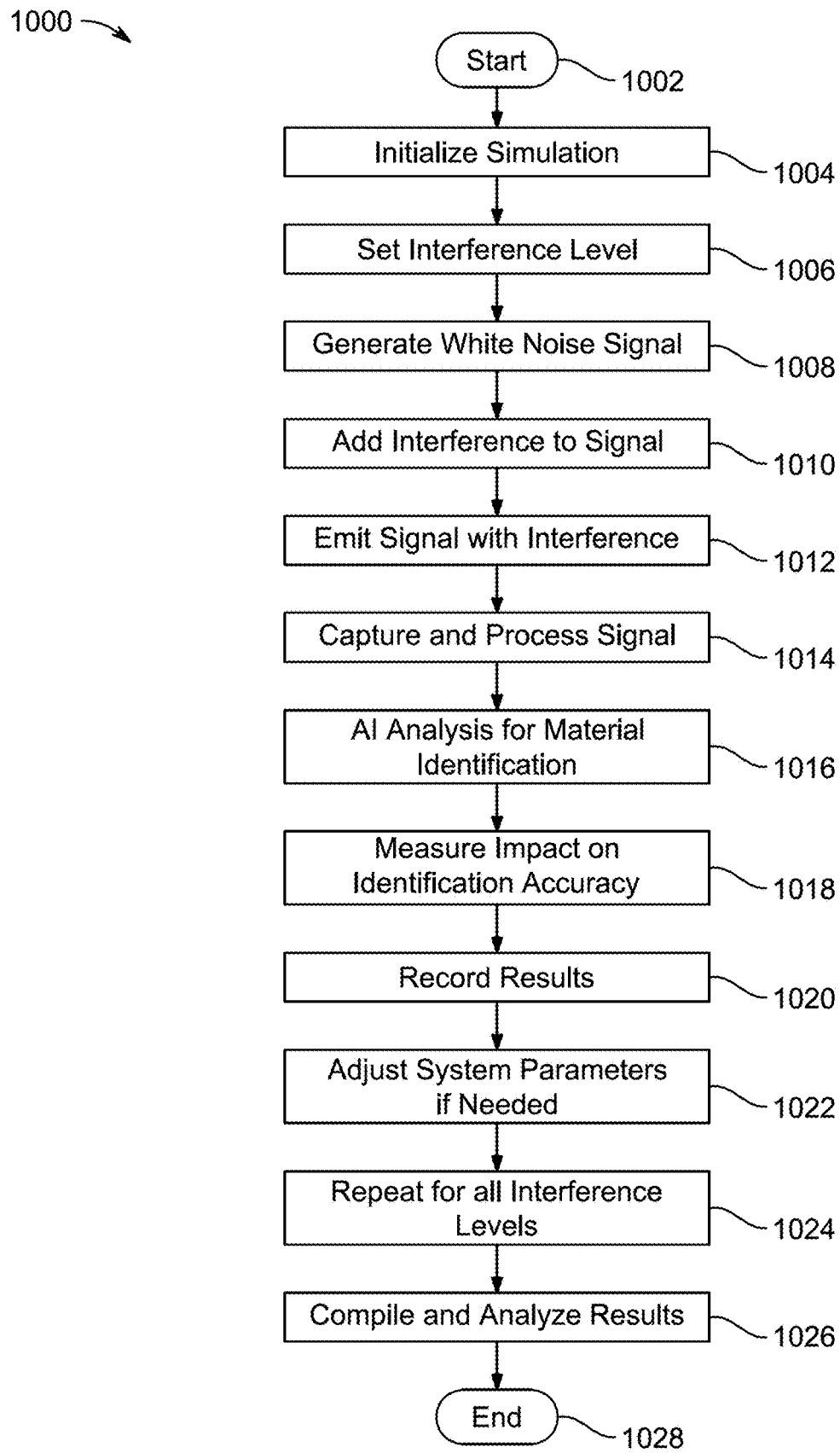
FIG. 10 illustrates a simulation methodology for evaluating and improving radar system robustness under varying interference conditions, in accordance with an exemplary aspect of the disclosure.

FIG. 10 illustrates a flowchart 100 depicting a simulation methodology designed to assess the robustness of the AI-enhanced white noise radar system against various levels of signal interference. This simulation is intended to evaluate the impact of different interference levels, including low, medium, and high, on the material identification accuracy of the system and to identify potential avenues for system refinement.

At step 1002, the simulation process is initiated, which sets the execution environment for evaluating the radar system under predefined interference conditions.

At step 1004, the simulation parameters are initialized, including the configurations necessary to emulate the radar operation and interference scenarios in a controlled virtual environment.

At step 1006, an interference level is selected from a range of predefined categories such as low, medium, or high. Each level corresponds to a specific configuration of extraneous noise sources or competing signal patterns that may affect the radar system's performance. Following this, at step 1008, a white noise signal is generated using a broad frequency spectrum to mimic the operational behavior of the radar transmitter described previously with respect to FIG. 2 and FIG. 3.

At step 1010, the generated signal is programmatically infused with the selected interference level. This artificial interference simulates real-world conditions such as electromagnetic noise from nearby radar systems or atmospheric fluctuations. The interfered signal is emitted toward a target at step 1012, maintaining alignment with the signal transmission logic discussed in earlier system architecture figures.

At step 1014, the reflected signal, modified by both the target material and the injected interference, is captured and processed. This step includes filtering and digitizing the received signal to make it compatible with subsequent AI-based analysis. At step 1016, the AI analysis module performs material identification by analyzing the processed signal for its spectral and temporal patterns, comparing them with pre-trained material signatures.

At step 1018, the impact of the interference on identification accuracy is quantified by comparing the identification result against outputs under noise-free conditions. For example, a degradation in classification confidence or a shift in prediction probability distributions would indicate the influence of the simulated interference.

At step 1020, the observed accuracy and associated metrics for the current interference level are documented for further analysis. If performance degradation exceeds an acceptable threshold, step 1022 involves modifying system parameters, such as adjusting filtering algorithms or re-weighting input features used in AI model inference.

At step 1024, the process is reiterated for the remaining interference levels to ensure that the radar system's performance is comprehensively evaluated under a range of operating conditions. Step 1026 aggregates and analyzes the results across all scenarios, enabling a comparative study of performance variations with respect to the different interference levels. The process concludes at step 1028.

This method allows the system developers to systematically investigate the radar system's resilience to real-world signal disturbances. As observed from simulation results illustrated in FIG. 9, the radar system retained relatively stable performance under low and medium interference scenarios, while demonstrating measurable accuracy deviations under high interference. These results serve as an input for optimizing both the signal processing pipeline and AI model configurations, thereby supporting system deployment in unpredictable or noisy environments, such as battlefields, urban landscapes with high RF congestion, or atmospheric monitoring in inclement weather conditions.

Figure 11:
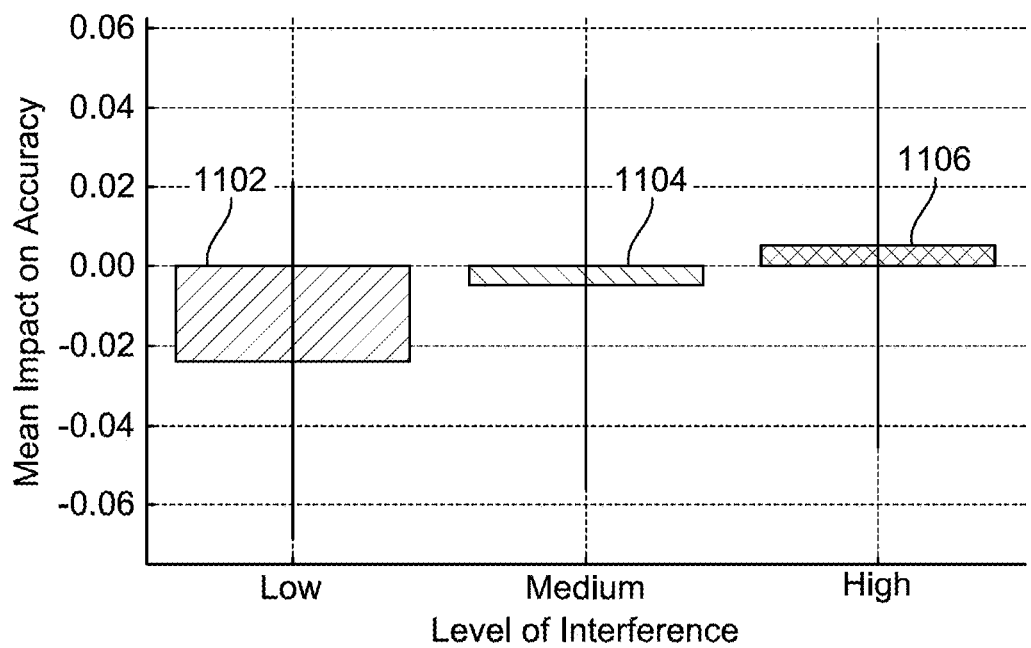
FIG. 11 illustrates a bar chart showing the mean impact of low, medium, and high interference on radar system classification accuracy, in accordance with an exemplary aspect of the disclosure.

FIG. 11 illustrates a bar chart representing the mean impact of signal interference on the identification accuracy of the AI-enhanced white noise radar system. The chart is organized across three predefined levels of signal interference: low, medium, and high. Each bar in the chart quantifies the average change in identification accuracy under the respective interference condition, with vertical lines extending from each bar denoting the associated standard deviation.

Bar 1102 corresponds to low interference and shows a slight negative mean impact on identification accuracy. This indicates that the system maintains consistent performance in environments with minimal external noise, such as clear atmospheric conditions or low-power adjacent signal emissions. The relatively short standard deviation range further indicates low variability across simulation runs at this interference level.

Bar 1104 corresponds to medium interference and indicates a marginally greater negative impact on identification accuracy compared to the low interference condition. The system experiences moderate variability in performance in the presence of increased electromagnetic noise, which may arise from overlapping radar transmissions or urban signal congestion. The extended error range reflects the system's sensitivity to signal overlap in such conditions.

Bar 1106 corresponds to high interference and presents a small positive mean impact on accuracy. However, this effect is not considered indicative of enhanced performance. The broader standard deviation indicates inconsistent results, likely due to unpredictable signal interactions or coincidental reinforcement of signal features under high-noise scenarios. This behavior signals potential vulnerability in the AI classification process under extreme interference conditions.

Figure 12:
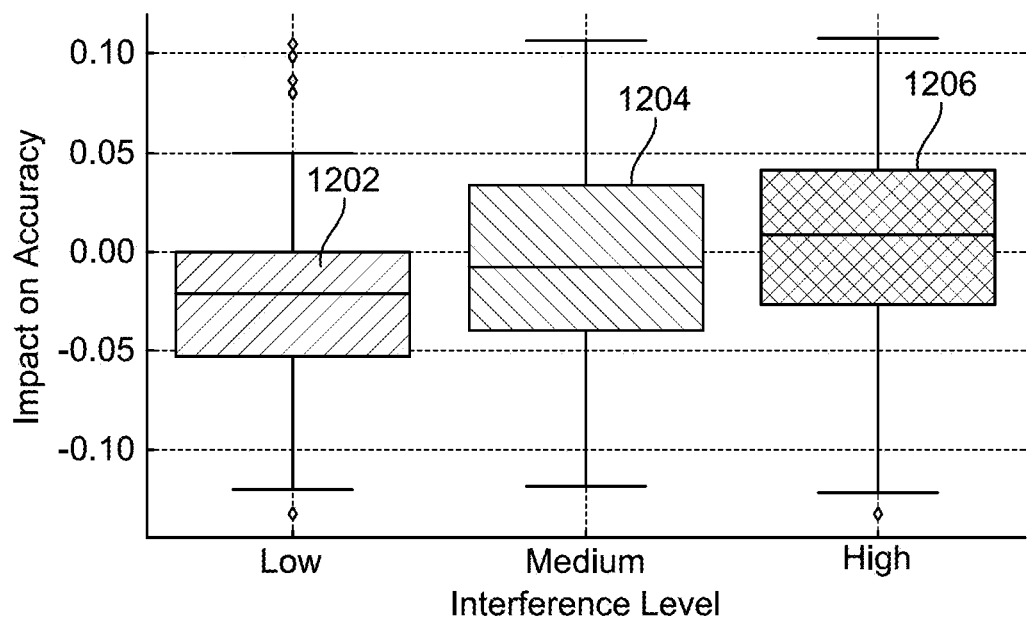
FIG. 12 illustrates box plots representing distribution and variability of classification accuracy under different levels of signal interference, in accordance with an exemplary aspect of the disclosure.

FIG. 12 presents a set of box plots showing the distribution of the impact of signal interference on identification accuracy, categorized by the same three levels of interference: low, medium, and high. Each plot provides statistical insight into the system's robustness by depicting the range, quartiles, median, and outliers observed across repeated simulation runs.

Box 1202 represents low interference and exhibits a narrow interquartile range centered near zero. This configuration indicates stable system performance with minimal deviation from baseline accuracy. The tight clustering of data points and minimal presence of outliers indicate high reliability in benign electromagnetic environments.

Box 1204 represents medium interference and shows a broader interquartile range along with a lower median value. The wider spread of data indicates variability in how the system handles intermediate levels of noise, such as those encountered near active radio-frequency sources or moderate signal congestion. The occurrence of additional outliers implies occasional misclassifications or degraded performance under these conditions.

Box 1206 represents high interference and displays the widest distribution among the three. The lower median and presence of several outliers reflect increased susceptibility to performance degradation under intense noise conditions, such as in proximity to high-power emitters or complex electromagnetic backgrounds. These results underscore the importance of refining signal denoising algorithms and improving AI generalization under high-variance input conditions.

Figure 13:
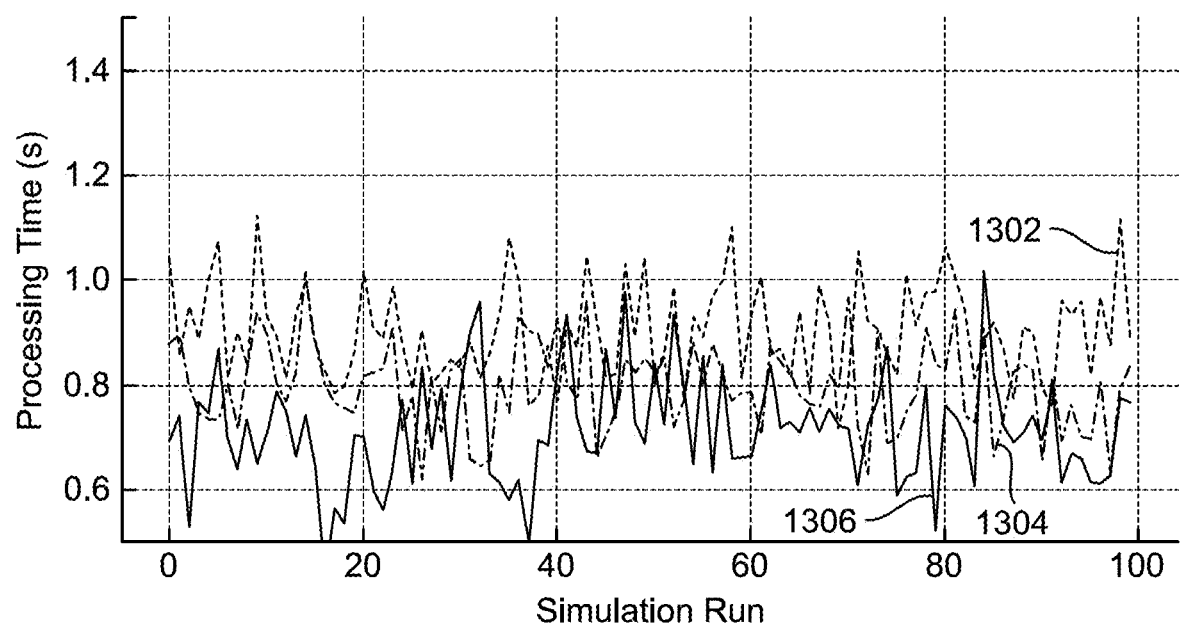
FIG. 13 illustrates line graphs showing the computational efficiency of the radar system under three different system configurations across multiple simulation runs, in accordance with an exemplary aspect of the disclosure.

FIG. 13 illustrates the simulation results for computational efficiency of the AI-enhanced white noise radar system under three distinct processing configurations: a basic configuration, an enhanced configuration, and an advanced configuration. The vertical axis represents the processing time in seconds, and the horizontal axis denotes successive simulation runs executed under consistent input conditions.

In the basic configuration, represented by a line graph 1302, the average processing time observed across simulation runs is approximately 0.90 seconds. This configuration is characterized by a conventional signal analysis pipeline without extensive hardware acceleration or optimized AI inference techniques. Processing delays in this configuration can be attributed to generic signal parsing routines and standard CPU-based machine learning operations. Variability in processing time is seen across different runs, which may result from variations in signal complexity and system load during runtime.

The enhanced configuration, represented by a line graph 1304, introduces performance improvements through moderate architectural optimizations, such as streamlined preprocessing steps and more efficient signal feature extraction algorithms. The average processing time in this configuration is reduced to approximately 0.80 seconds. By utilizing a hybrid computation approach involving both CPU and GPU resources, the enhanced configuration achieves a balance between computational demand and real-time responsiveness.

The advanced configuration, represented by a line graph 1306, demonstrates the highest degree of computational efficiency, with an average processing time of approximately 0.71 seconds. This configuration integrates advanced AI accelerators, such as dedicated inference engines or edge AI chips, and benefits from optimized memory management and parallel signal processing frameworks. This reduction in latency permits the radar system to be deployed in real-time applications, such as onboard identification systems for aerial platforms operating under time-sensitive conditions.

The performance variations across the configurations highlight the scalability and adaptability of the radar system in different deployment scenarios. For example, while the basic configuration may be suitable for offline analysis or stationary monitoring systems, the advanced configuration is well-suited for dynamic, in-field operations requiring high-throughput processing. This performance characterization establishes a technical basis for selecting or upgrading computational infrastructure according to operational needs and resource availability.

Figure 14:
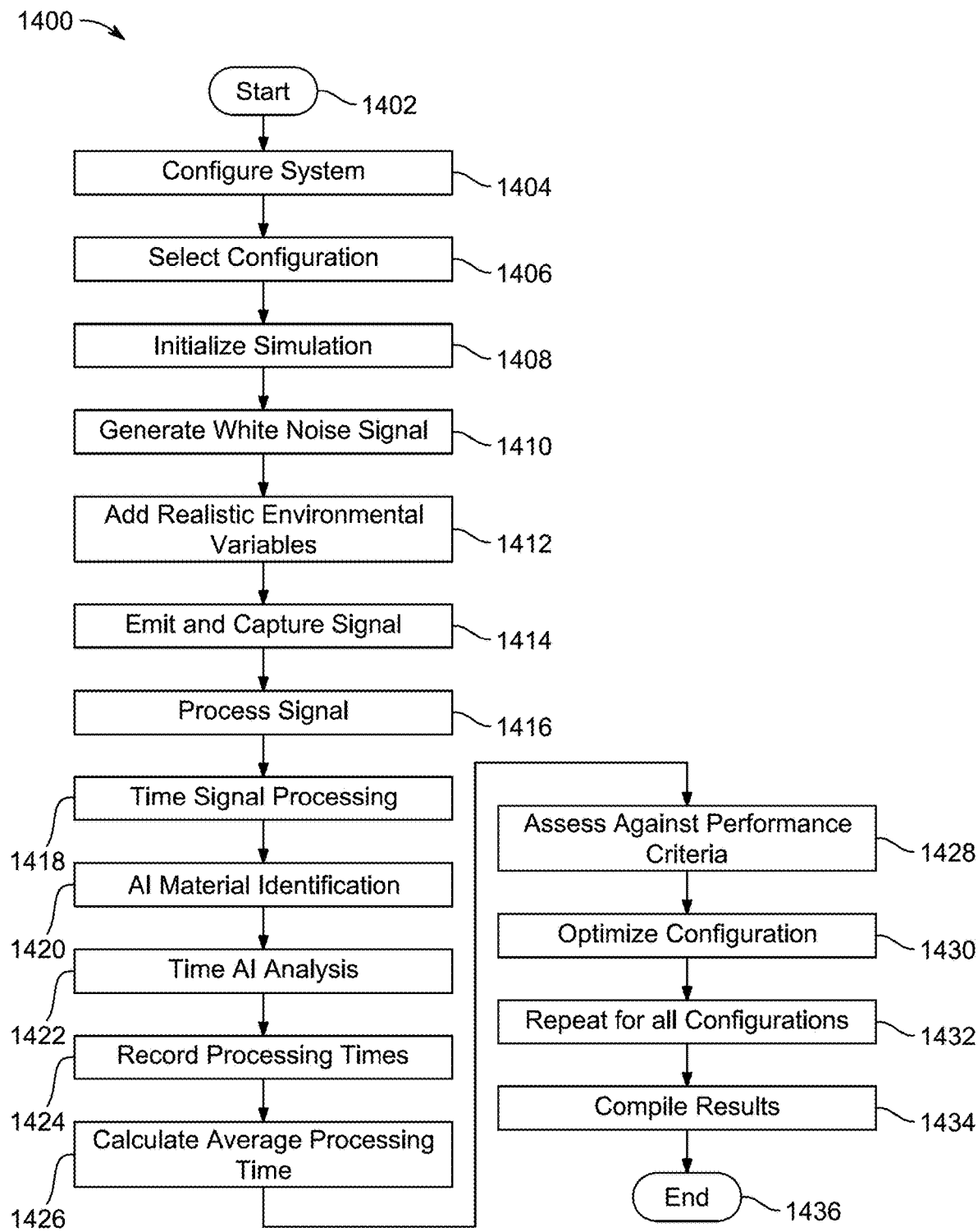
FIG. 14 illustrates a flowchart of a simulation procedure for evaluating radar signal processing and classification times under various computational configurations, in accordance with an exemplary aspect of the disclosure.

FIG. 14 illustrates a computational efficiency evaluation workflow 1400 implemented to assess the processing performance of an AI-enhanced white noise radar system across multiple configurations. At step 1402, the evaluation process is initiated. At step 1404, the radar system is configured according to the experimental setup. At step 1406, one of the system configurations, including basic, enhanced, or advanced, is selected. At step 1408, the simulation environment is initialized with parameters representing realistic operational conditions. At step 1410, a white noise radar signal is generated to simulate broad-spectrum signal emission. At step 1412, environmental variables such as signal distortion or ambient noise are introduced to replicate real-world variability. At step 1414, the white noise signal is emitted toward a target and the reflected signal is captured. At step 1416, the received signal is digitally processed to prepare it for AI-based analysis. At step 1418, the signal processing time is measured. At step 1420, AI-driven material identification is performed. At step 1422, the time required by the AI module to complete the identification is recorded. At step 1424, all processing times are logged. At step 1426, the average processing time is calculated over multiple runs. At step 1428, the processing performance is evaluated against predefined operational benchmarks. At step 1430, if needed, configuration parameters are optimized to reduce latency or enhance processing efficiency. At step 1432, the procedure is repeated for all available system configurations. At step 1434, the results are aggregated to support comparative performance analysis. At step 1436, the evaluation process concludes.

Figure 15:
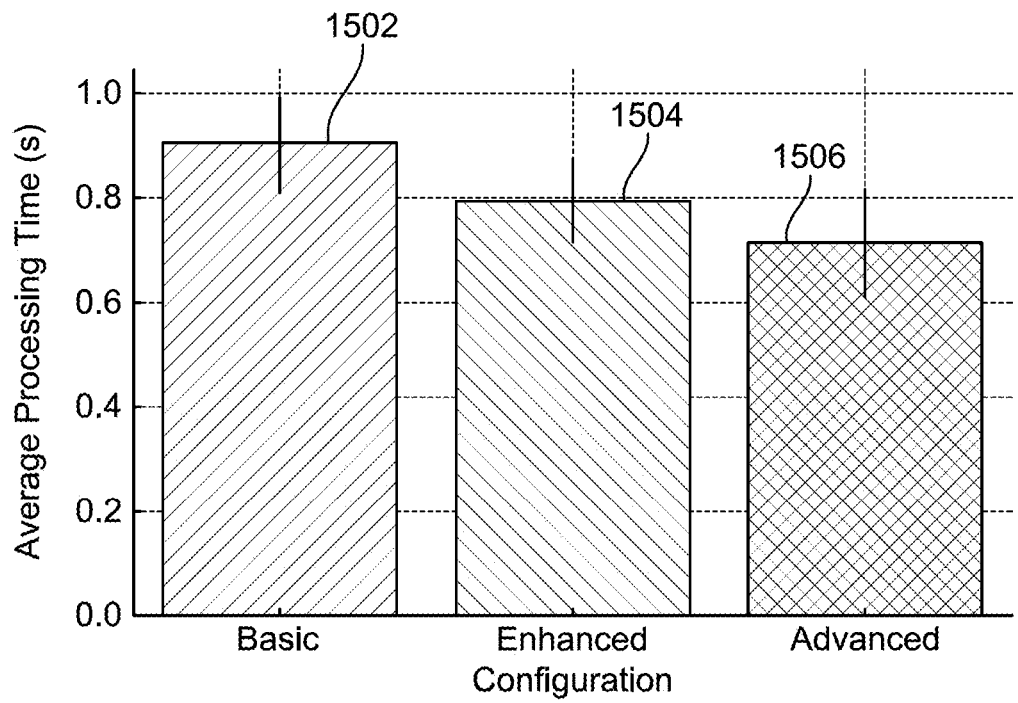
FIG. 15 illustrates a bar plot summarizing the average processing time of the radar system across basic, enhanced, and advanced configurations, in accordance with an exemplary aspect of the disclosure.

FIG. 15 presents a bar plot that visualizes the average signal processing time for each of the three system configurations: basic, enhanced, and advanced. Bar 1502 corresponds to the basic configuration and shows the shortest average processing time, indicating minimal computational overhead. Bar 1504 represents the enhanced configuration and reflects a slightly longer average processing time, attributed to more complex data handling and analysis routines. Bar 1506 illustrates the advanced configuration, which exhibits the highest average processing time, indicating increased computational demands due to sophisticated AI modeling and signal processing capabilities. The associated error bars indicate variability across simulation runs, with wider bars indicating more fluctuation in processing times.

Figure 16:
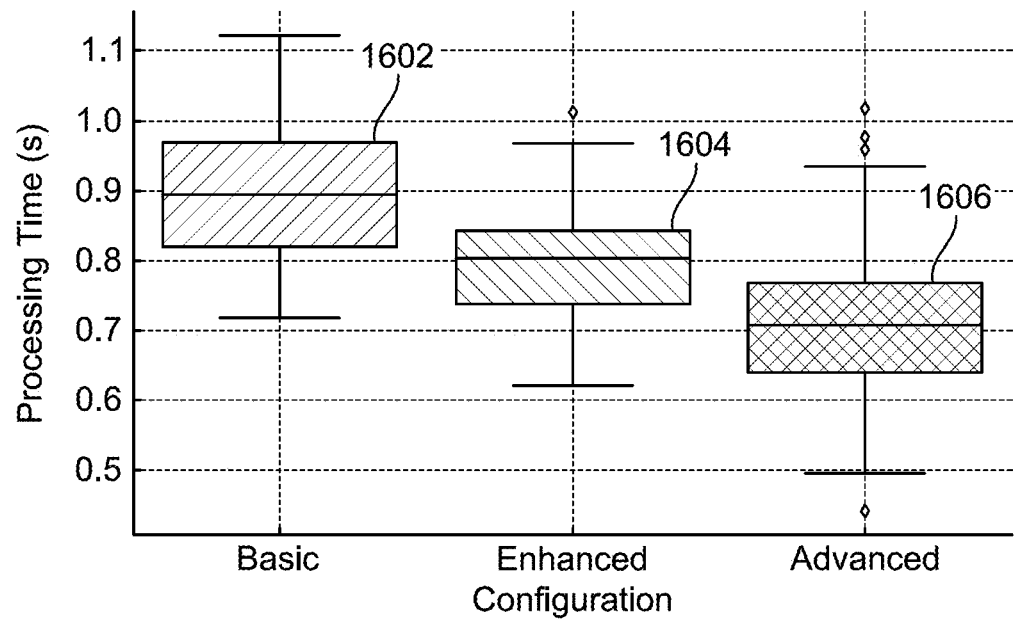
FIG. 16 illustrates box plots indicating variability in signal processing times across different system configurations, in accordance with an exemplary aspect of the disclosure.

FIG. 16 depicts a box plot for the distribution of signal processing times across the three system configurations. Box 1602 corresponds to the basic configuration and demonstrates a narrow spread with a low median, indicating consistent and rapid processing performance. Box 1604, representing the enhanced configuration, exhibits a broader interquartile range with a moderate median, indicating an increase in both processing complexity and variability. Box 1606, representing the advanced configuration, shows the widest spread and the highest median, reflecting considerable variability in processing time due to advanced computational operations. The presence of outliers further illustrates the impact of environmental variability and data complexity on system performance.

Figure 17A:
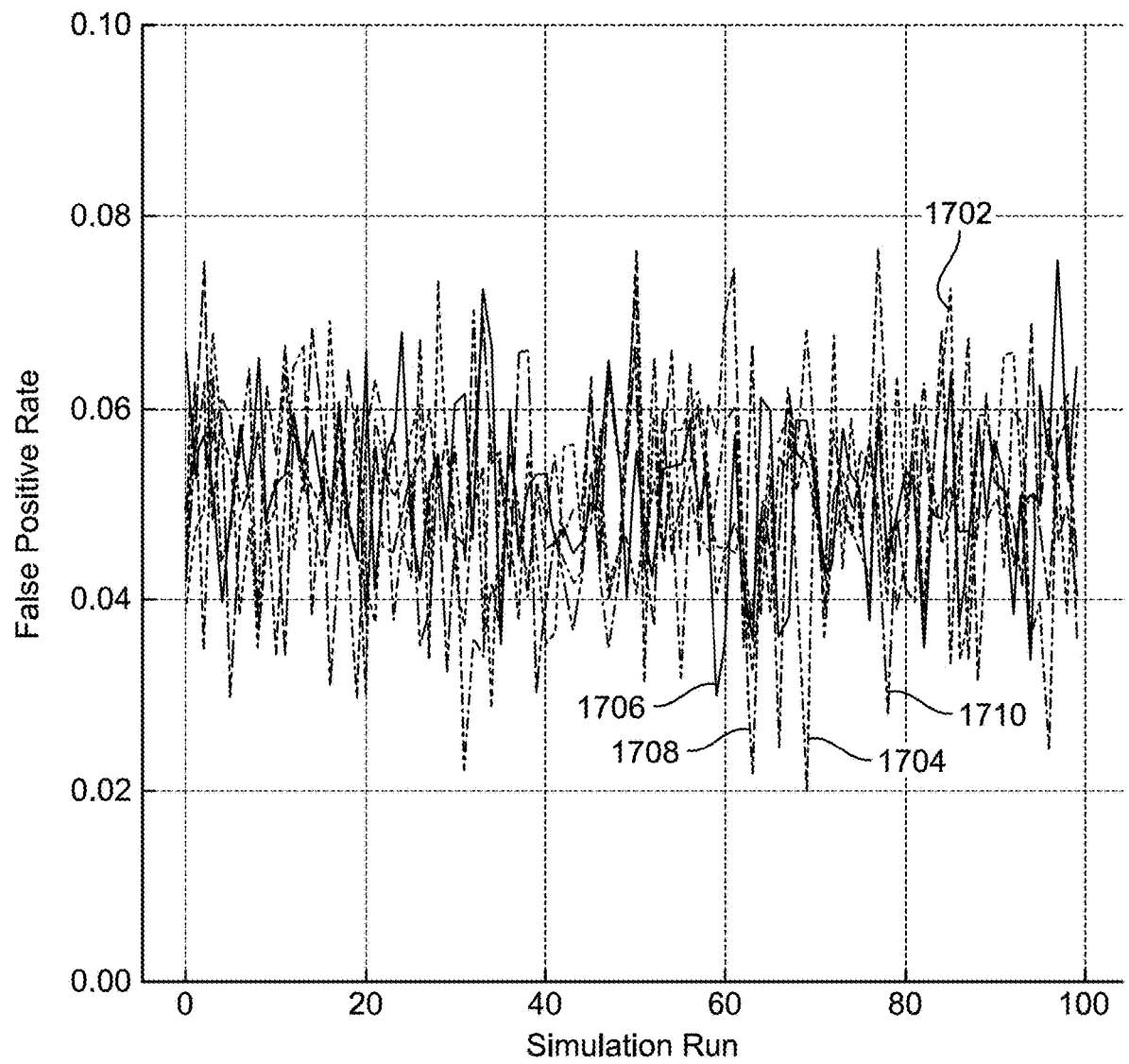
FIG. 17A illustrates a graph representing false positive rates in material classification across multiple simulation runs for various materials, in accordance with an exemplary aspect of the disclosure.

FIG. 17A illustrates a simulation-based comparison of false positive rates associated with material identification by the AI-enhanced radar system. Line 1702 corresponds to metal, line 1704 to plastic, line 1706 to explosives, line 1708 to organic compounds, and line 1710 to electronics. Across 100 simulation runs, the average false positive rate for all material types remained at or below 5%, with minor fluctuations across individual runs. This outcome indicates robust material classification by the AI module, with minimal instances of misidentification due to noise or overlapping signal features.

Figure 17B:
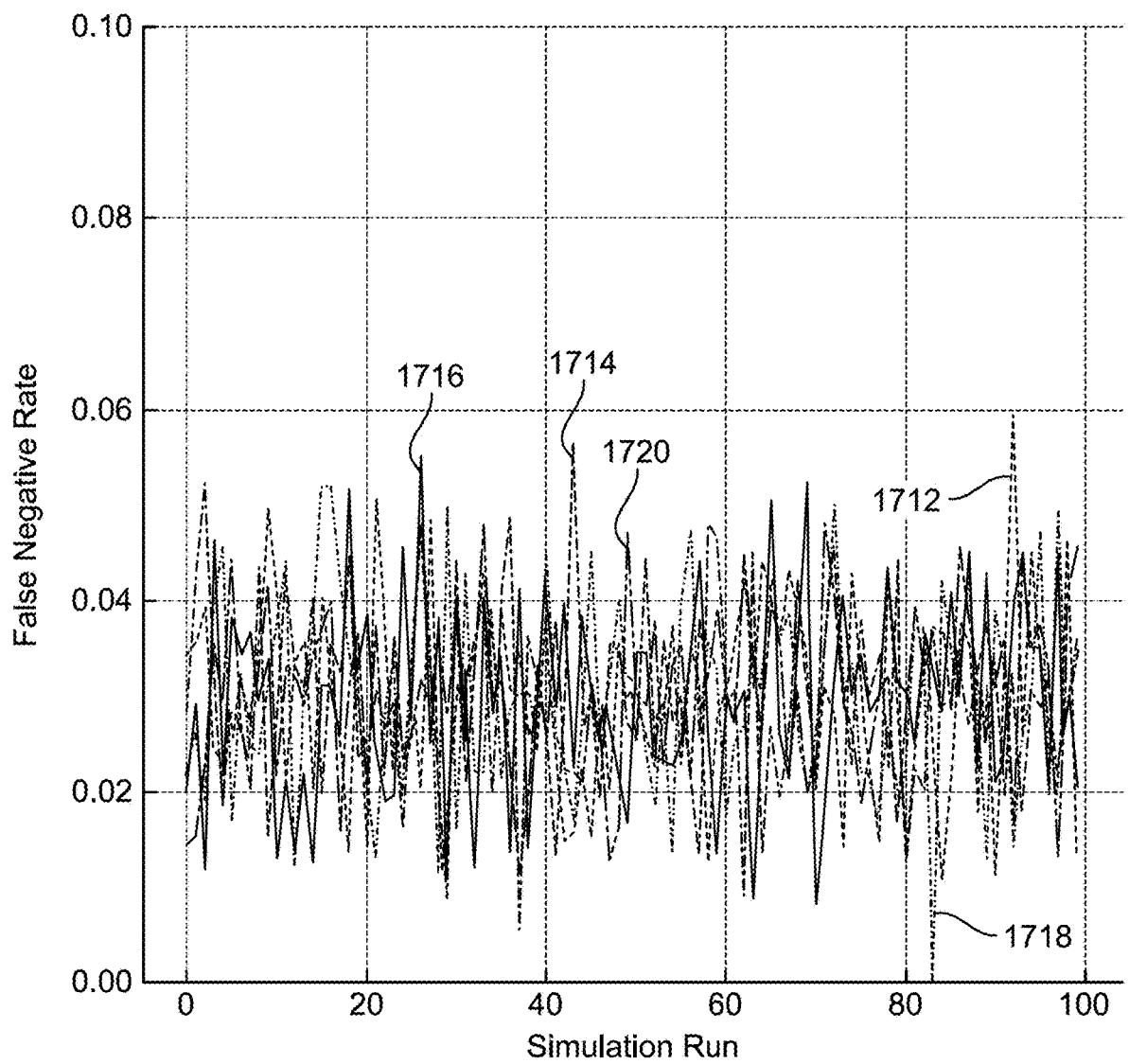
FIG. 17B illustrates a graph representing false negative rates for material classification across multiple simulation runs for various materials, in accordance with an exemplary aspect of the disclosure.

FIG. 17B illustrates false negative rates recorded across the same simulation runs. Line 1712 corresponds to metal, line 1714 to plastic, line 1716 to explosives, line 1718 to organic compounds, and line 1720 to electronics. The false negative rates averaged approximately 3% for each material type, indicating high sensitivity of the system in detecting target materials. The consistency of performance across materials in terms of low false negative rates demonstrates that the AI algorithms are well-tuned to correctly identify materials with minimal omission, even under variable input conditions.

Figure 18:
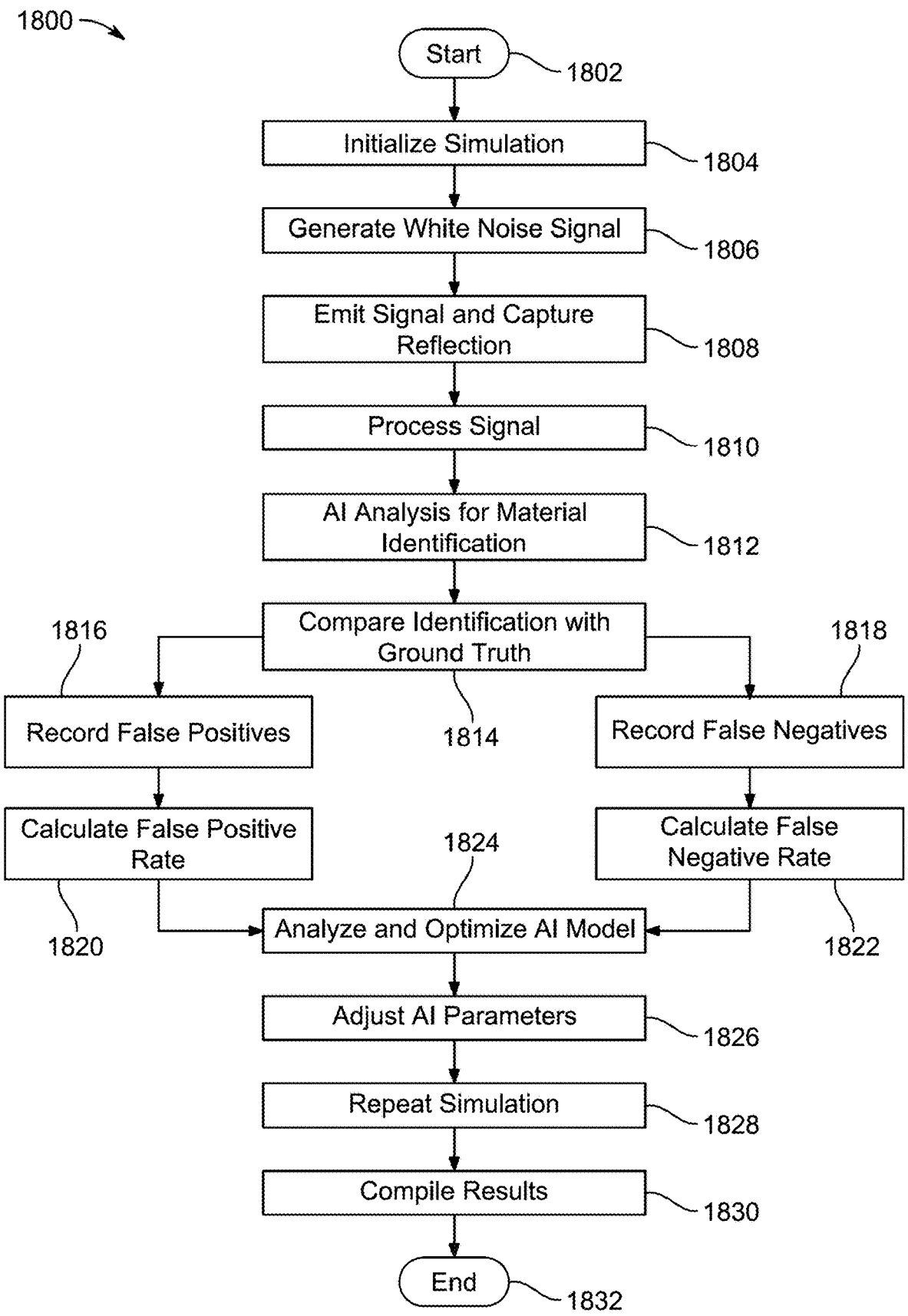
FIG. 18 illustrates a simulation flowchart depicting the methodology for assessing and refining false positive and false negative rates using feedback-based model retraining, in accordance with an exemplary aspect of the disclosure.

FIG. 18 illustrates a flowchart 1800 depicting the methodology employed to evaluate the false positive and false negative rates of the AI-Enhanced White Noise Radar System for material identification. At step 1802, the process is initiated to assess classification errors. At step 1804, the radar system simulation is initialized with predefined environmental and signal parameters. At step 1806, a white noise signal is generated to cover a broad spectrum of frequencies for material interrogation. At step 1808, the signal is emitted toward a simulated target, and reflections are captured. At step 1810, the reflected signals are processed to extract features relevant to material identification. At step 1812, the AI algorithms analyze the processed data to classify material types. At step 1814, the identified materials are compared against ground truth data. At step 1816, instances of false positives, where the system incorrectly detects a material that is not present, are recorded. At step 1818, instances of false negatives, where the system fails to detect a present material, are logged. At step 1820, the false positive rate is computed, while at step 1822, the false negative rate is calculated. At step 1824, the results are analyzed to optimize the AI model performance. At step 1826, AI parameters are adjusted to improve classification accuracy. At step 1828, the simulation is repeated to validate the adjustments. At step 1830, the results across runs are compiled for review. At step 1832, the testing process concludes.

Figure 19A:
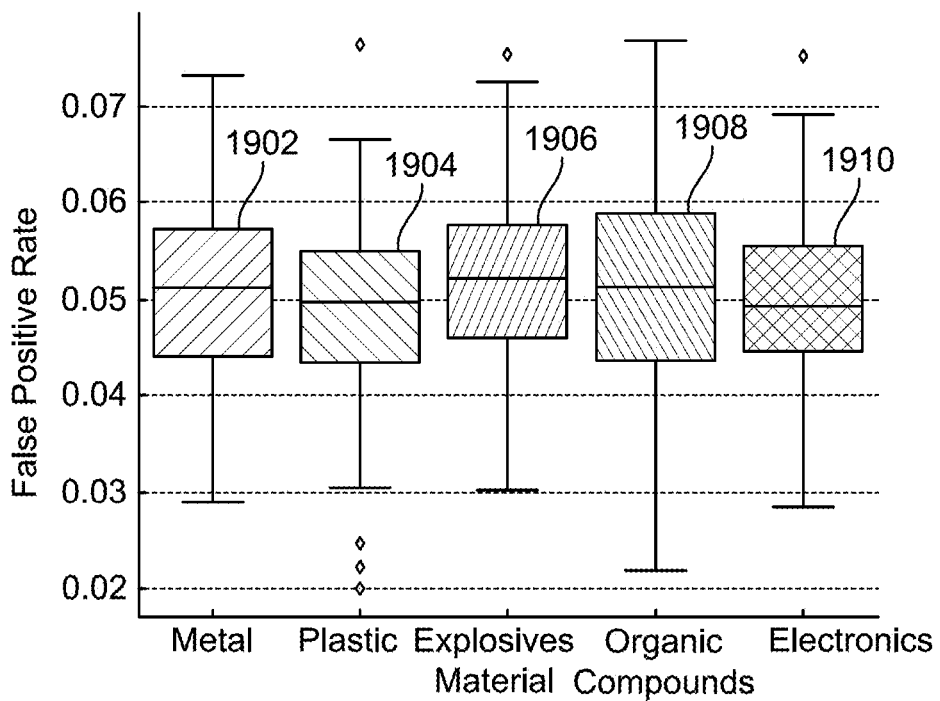
FIG. 19A illustrates box plots representing the distribution of false positive rates for various material categories, in accordance with an exemplary aspect of the disclosure.

FIG. 19A provides a box plot visualization of the false positive rates across various materials including metal, plastic, explosives, organic compounds, and electronics. Bar 1902, corresponding to metal, and bar 1904, corresponding to plastic, depict tightly grouped interquartile ranges with low median values, indicating consistency and low false alarm rates. Bar 1906 for explosives and bar 1908 for organic compounds display slightly wider spreads and occasional outliers, indicating variability in detection accuracy. Bar 1910, corresponding to electronics, also maintains a compact range with infrequent spikes in false detection.

Figure 19B:
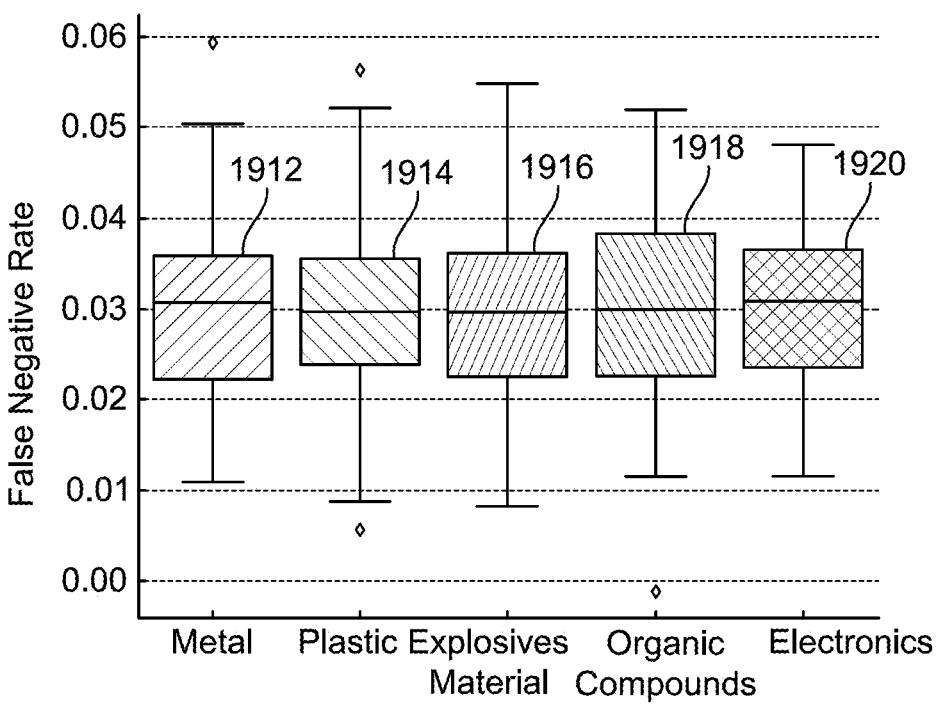
FIG. 19B illustrates box plots showing the distribution of false negative rates across materials under simulated classification tests, in accordance with an exemplary aspect of the disclosure.

FIG. 19B presents box plots summarizing the false negative rates across the same material categories. Bar 1912, corresponding to metal, and bar 1914, corresponding to plastic, show low median values and narrow distributions, indicating high sensitivity of the radar system. Bar 1916 for explosives and bar 1918 for organic compounds reflect broader variability, which may be attributed to complexities in signal reflection characteristics. Bar 1920 for electronics similarly shows a balanced distribution with limited outliers, reinforcing the reliability of detection.

Figure 20A:
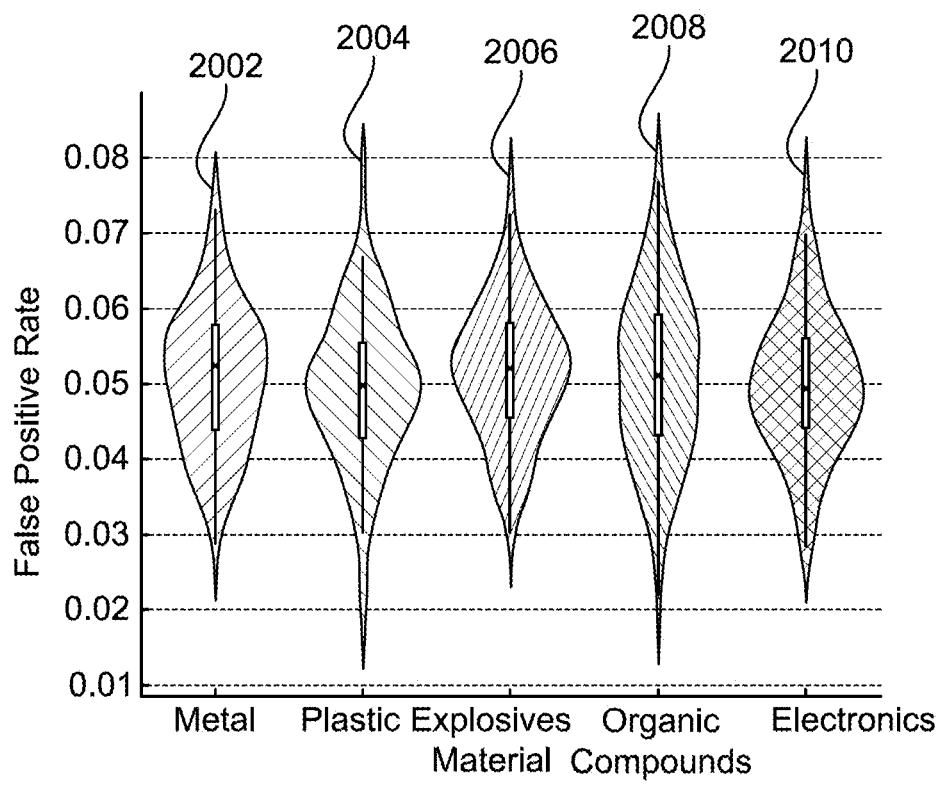
FIG. 20A illustrates violin plots for visualizing distribution density of false positive rates per material category, in accordance with an exemplary aspect of the disclosure.

FIG. 20A illustrates violin plots of the false positive rates across materials, offering insight into the distribution density. Each violin plot, such as element 2002 for metal and 2004 for plastic, shows denser concentrations of data points at lower false positive rates. Element 2006, corresponding to explosives, and element 2008, corresponding to organic compounds, reveal wider spread distributions with modestly higher density tails, indicating variability. Element 2010 for electronics maintains density skewed toward lower error rates.

Figure 20B:
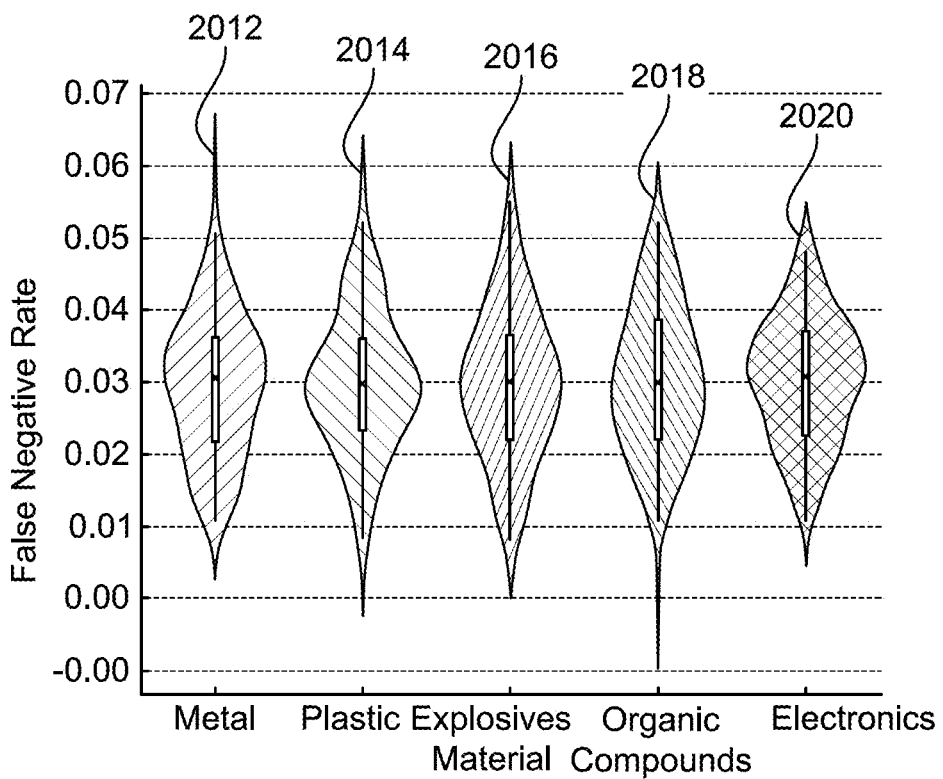
FIG. 20B illustrates violin plots representing distribution profiles of false negative rates for various materials, in accordance with an exemplary aspect of the disclosure.

FIG. 20B displays violin plots for false negative rates. The distribution patterns of each material, including metal represented by an element 2012, plastic, represented by an element 2014, explosives, represented by an element 2016, organic compounds, represented by an element 2018, and electronics, represented by an element 2012 again, reveal that the majority of data points cluster around lower error values. The violin for organic compounds shows the most pronounced width, implying greater fluctuation in missed detections. These visualizations support tuning strategies for error mitigation.

Figure 21:
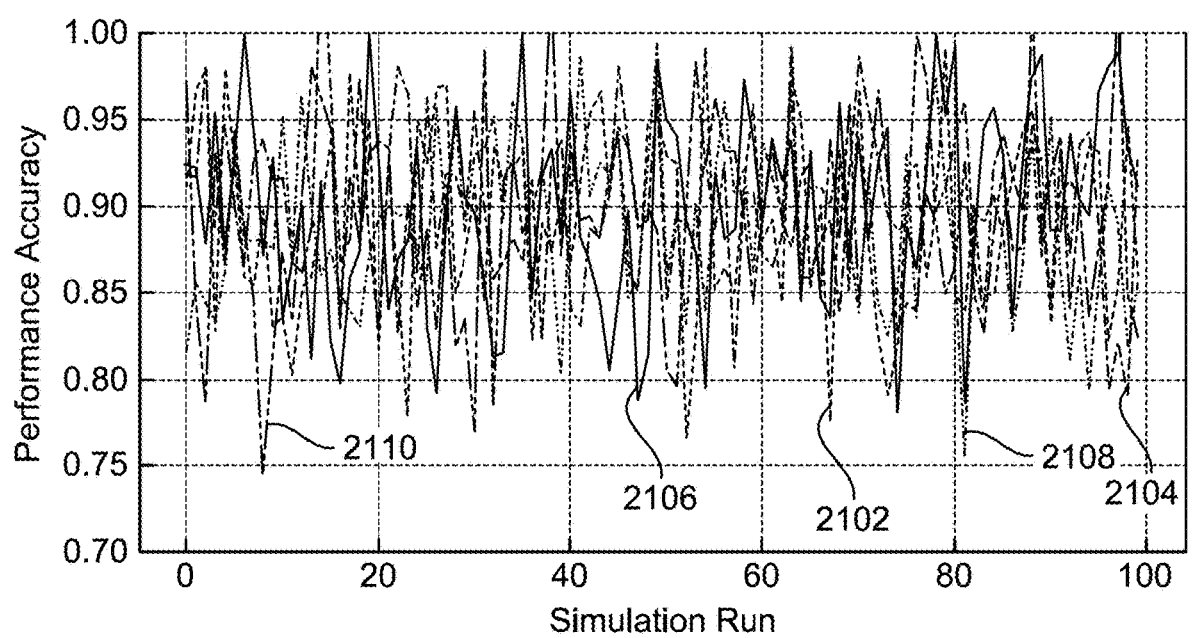
FIG. 21 illustrates a simulation result showing performance accuracy of the radar system across various environmental conditions, in accordance with an exemplary aspect of the disclosure.

FIG. 21 illustrates simulation results representing the radar system's performance under various environmental conditions. Each line corresponds to a different scenario, bar 2102 for clear conditions, bar 2104 for rainy, bar 2106 for foggy, bar 2108 for low altitude, and bar 2110 for high altitude. The y-axis denotes performance accuracy, while the x-axis represents individual simulation runs. Across all conditions, the average identification accuracy remains high, approximately 0.89 to 0.90), affirming the system's resilience. Slight fluctuations in accuracy under foggy or high-altitude conditions reflect minor performance degradation, potentially due to increased signal scattering or reduced reflectivity. These findings demonstrate that the AI-Enhanced White Noise Radar System is capable of maintaining consistent material identification accuracy across a diverse range of operating environments, validating its suitability for real-world deployment in variable atmospheric and altitudinal contexts.

Figure 22:
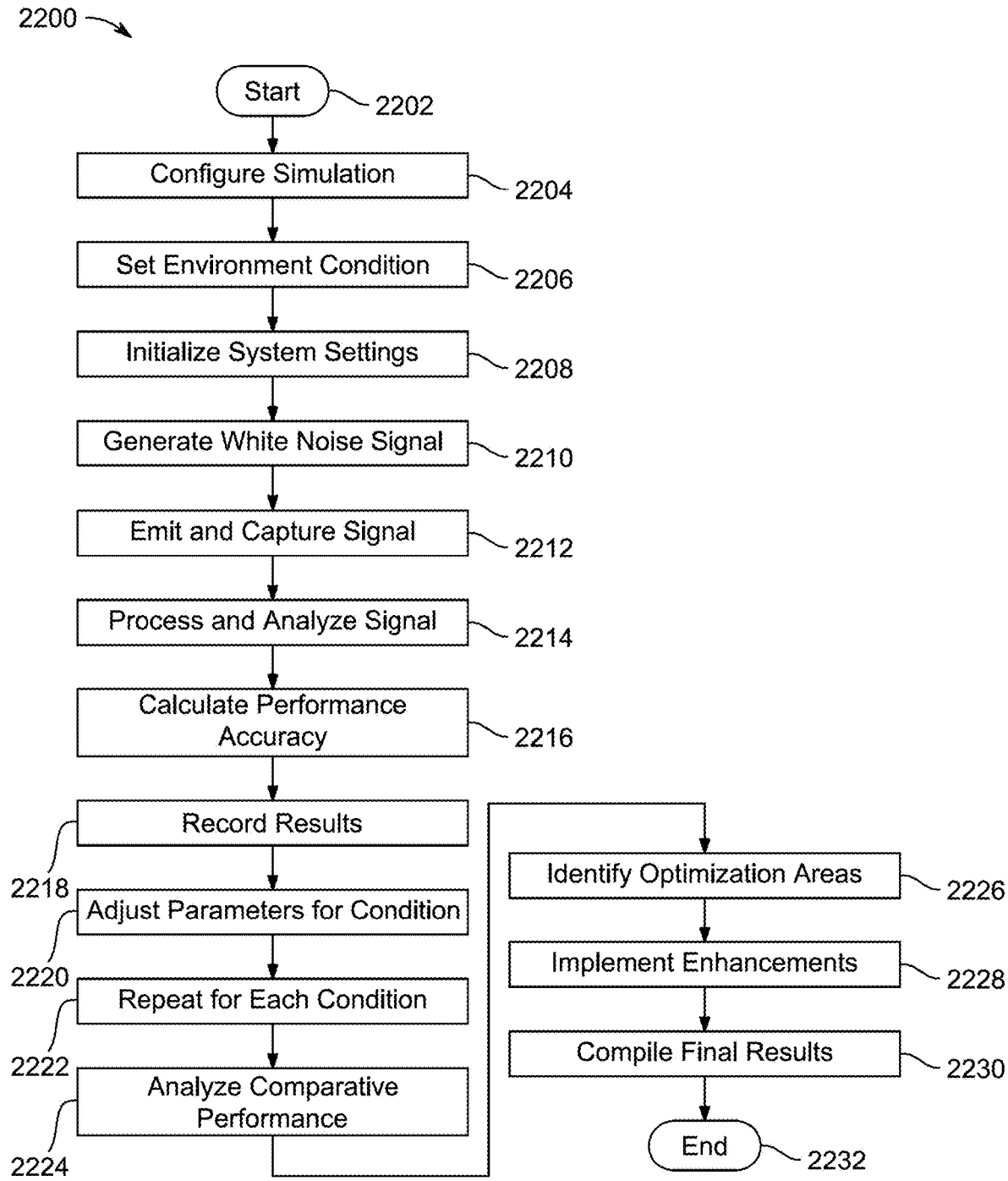
FIG. 22 illustrates a simulation evaluation flowchart for testing system performance under multiple environmental conditions and implementing enhancements based on comparative analysis, in accordance with an exemplary aspect of the disclosure.

FIG. 22 illustrates a flowchart 2200 representing the methodology for evaluating the performance of the AI-enhanced white noise radar system across various environmental conditions. The process begins at step 2202, where the evaluation is initiated. At step 2204, the simulation is configured to model real-world operational parameters of the radar system. At step 2206, a specific environmental condition is set, which may include clear, rainy, or foggy weather, or varying altitude conditions such as low or high altitude. At step 2208, the system settings are initialized to accommodate the defined environmental condition.

At step 2210, a white noise signal is generated to serve as the probing waveform for radar-based material identification. At step 2212, the generated signal is emitted toward a target, and the reflected signals are captured. At step 2214, the captured signal is processed and analyzed by the system's AI-based analysis module. At step 2216, performance accuracy under the respective condition is calculated based on successful material identifications. At step 2218, the performance metrics are recorded for the specific condition.

At step 2220, system parameters are adjusted to optimize performance for the given environmental condition. At step 2222, the entire procedure is repeated for all defined environmental conditions to ensure comprehensive evaluation. At step 2224, the results are comparatively analyzed across different conditions. At step 2226, optimization areas are identified where system performance could be further enhanced. At step 2228, system improvements are implemented based on the analysis. At step 2230, final results are compiled, and the process concludes at step 2232.

Figure 23:
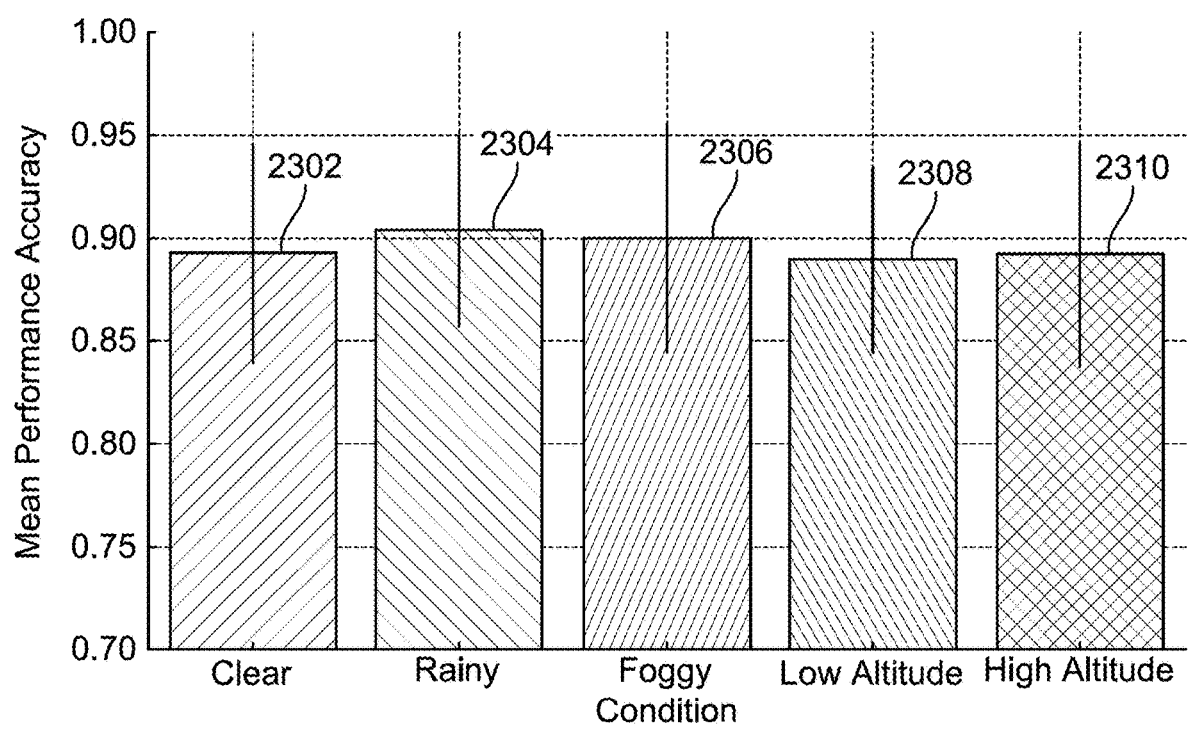
FIG. 23 illustrates a bar chart depicting mean identification accuracy and standard deviation under clear, rainy, foggy, low altitude, and high altitude conditions, in accordance with an exemplary aspect of the disclosure.

FIG. 23 illustrates a bar chart representing the mean performance accuracy of the radar system across five distinct environmental conditions: clear represent by bar 2302, rainy represent by bar 2304, foggy represent by bar 2306, low altitude represent by bar 2308, and high altitude represent by bar 2310. Each bar represents the average accuracy value computed over multiple simulation runs, while the error bars show the corresponding standard deviation. The bar 2302 corresponding to clear weather displays the highest mean performance accuracy, indicating optimal system functionality in unobstructed conditions. The bars (2304, 2306) corresponding to rainy and foggy respectively conditions show slightly reduced accuracies, reflecting the challenges imposed by atmospheric disturbances on radar signal propagation. The bars for low altitude (2308) and high altitude (2310) also indicate high average performance, with the high-altitude configuration exhibiting a wider error margin, which may be attributable to reduced air density or signal dispersion variability at elevated altitudes.

Figure 24A:
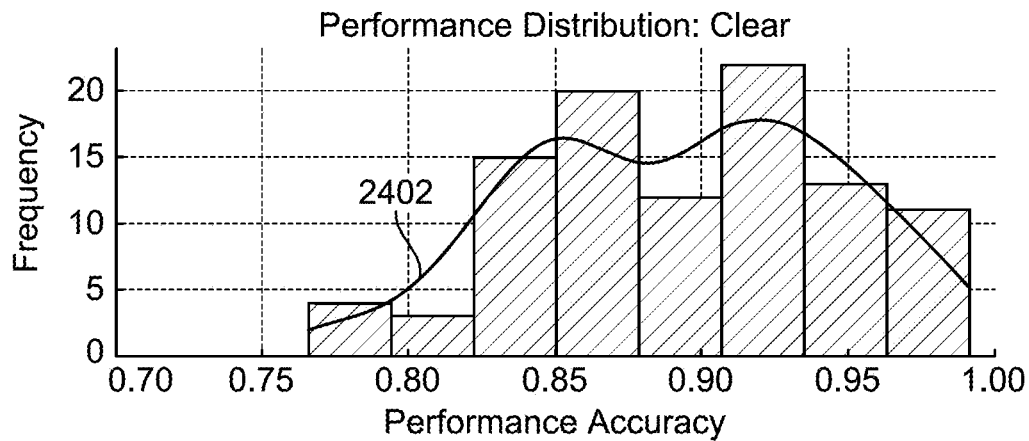
FIG. 24A illustrates a histogram with a kernel density estimation curve for the distribution of identification accuracy under clear weather conditions, in accordance with an exemplary aspect of the disclosure.
Figure 24B:
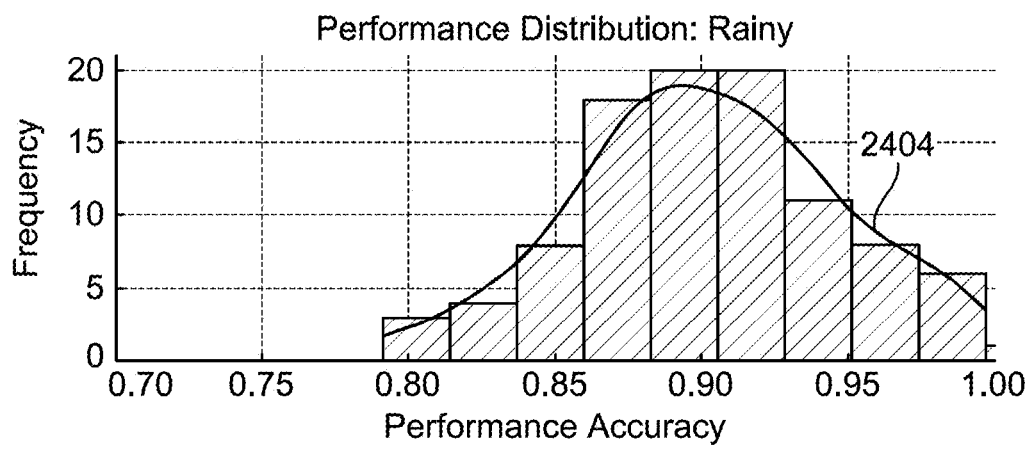
FIG. 24B illustrates a histogram with a kernel density estimation curve for the distribution of identification accuracy under rainy conditions, in accordance with an exemplary aspect of the disclosure.

FIG. 24A through FIG. 24E present histograms overlaid with kernel density estimation (KDE) curves for the distribution of performance accuracies under different environmental conditions, based on the recorded simulation results. FIG. 24A shows the distribution under clear conditions, represented by curve 2402, where performance accuracy is densely clustered around high values, indicating stable and reliable system behavior. FIG. 24B illustrates the distribution under rainy conditions, represented by curve 2404, where a broader distribution is observed, reflecting a moderate reduction in signal fidelity and corresponding impact on AI-based material identification accuracy.

Figure 24C:
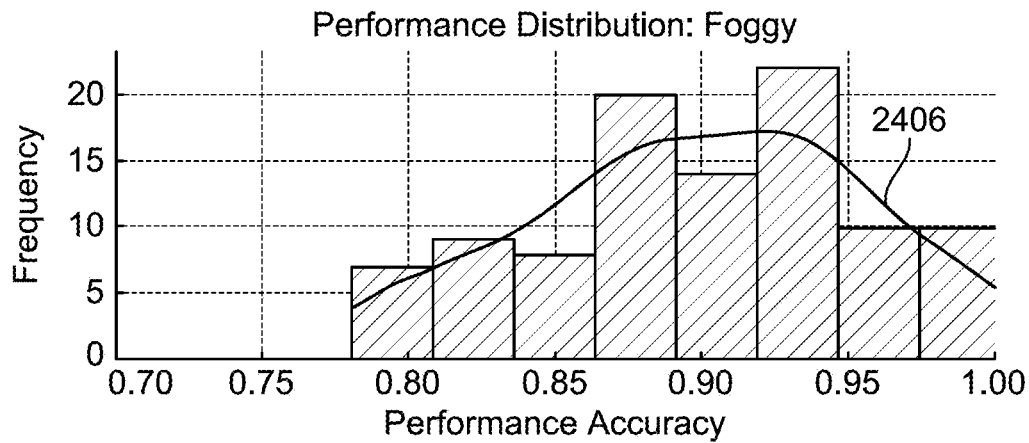
FIG. 24C illustrates a histogram with a kernel density estimation curve for the distribution of identification accuracy under foggy conditions, in accordance with an exemplary aspect of the disclosure.

FIG. 24C displays the distribution under foggy conditions, represented by curve 2406, demonstrating a wider spread and a modest skew towards lower accuracy values. This indicates the increased challenge in detecting materials accurately when signal clarity is reduced due to scattering by fog particles.

Figure 24D:
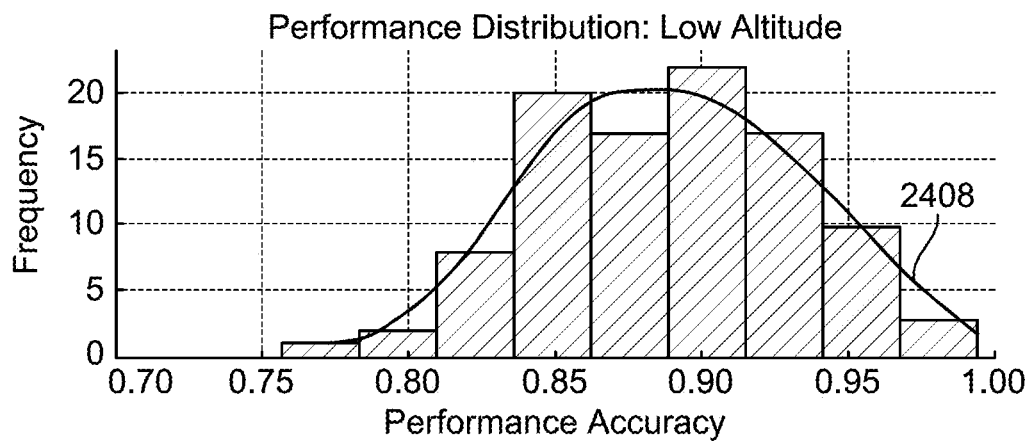
FIG. 24D illustrates a histogram with a kernel density estimation curve for the distribution of identification accuracy under low altitude conditions, in accordance with an exemplary aspect of the disclosure.

FIG. 24D depicts performance accuracy at low altitude, represented by curve 2408, where the distribution is relatively narrow and centralized around high accuracy values, confirming the system's robustness in low-altitude operational zones.

Figure 24E:
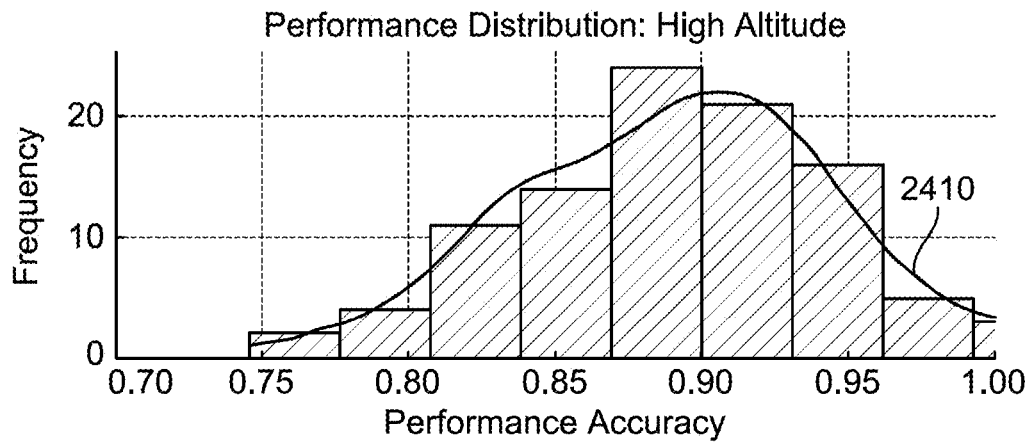
FIG. 24E illustrates a histogram with a kernel density estimation curve for the distribution of identification accuracy under high altitude conditions, in accordance with an exemplary aspect of the disclosure.

FIG. 24E presents the accuracy distribution at high altitude, represented by curve 2410, which shows a more dispersed profile with several lower accuracy instances. This variability can be attributed to the influence of high-altitude atmospheric conditions on radar wave propagation and signal interpretation.

Figure 25A:
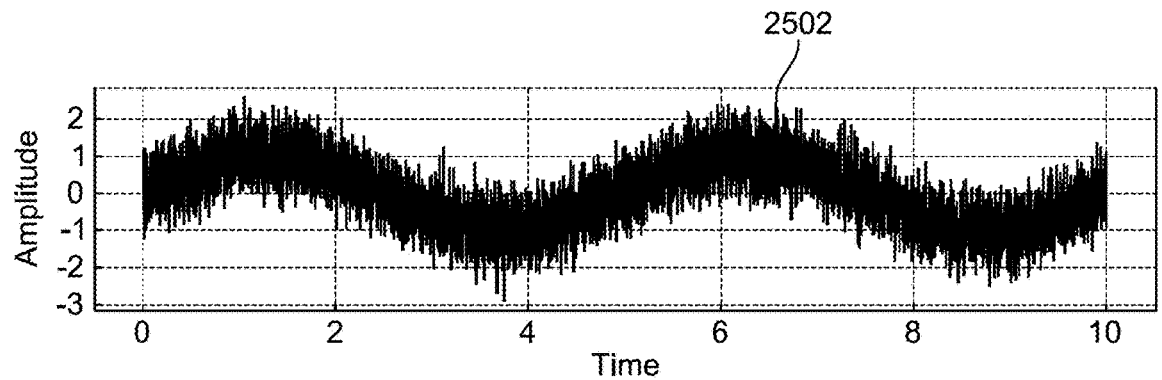
FIG. 25A illustrates a waveform of a generated complex white noise radar signal incorporating both random and periodic components, in accordance with an exemplary aspect of the disclosure.

FIG. 25A illustrates the generated complex white noise radar signal over time. The signal waveform 2502 in FIG. 25A includes a combination of random noise and a superimposed sinusoidal component. This simulated waveform reflects a more realistic radar emission pattern, incorporating both stochastic and deterministic characteristics. Such complexity allows the radar system to be tested under conditions that resemble real-world signal modulations where environmental fluctuations and platform-induced variations may impact transmission integrity.

Figure 25B:
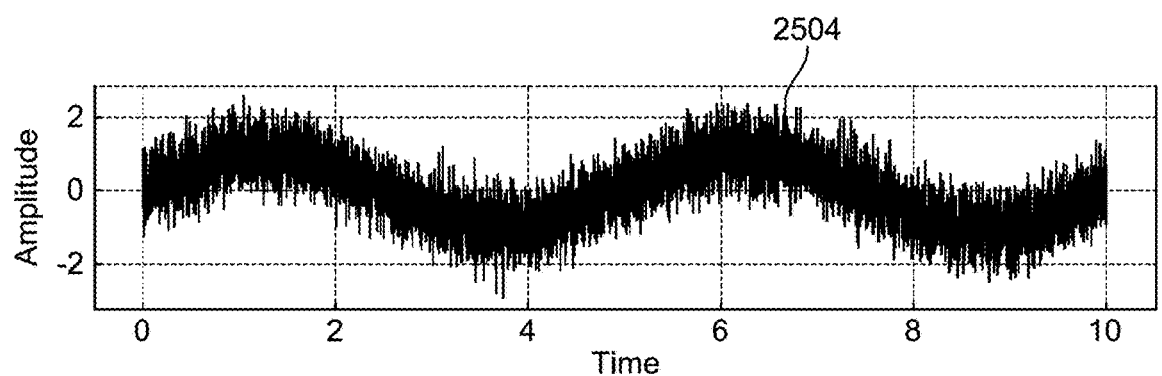
FIG. 25B illustrates a waveform of a received complex radar signal that reflects interactions with multiple material targets and environmental effects, in accordance with an exemplary aspect of the disclosure.

FIG. 25B depicts the complex received radar signal following interaction with multiple material targets and environmental influences. The waveform 2504 shown in FIG. 25B includes distortions in both amplitude and phase, demonstrating the effect of material composition, dielectric variation, and multi-path reflection on the radar echo. The received signal is markedly different from the transmitted signal shown in FIG. 25A, reflecting the propagation effects encountered in operational scenarios such as clutter, attenuation, and scattering.

Figure 25C:
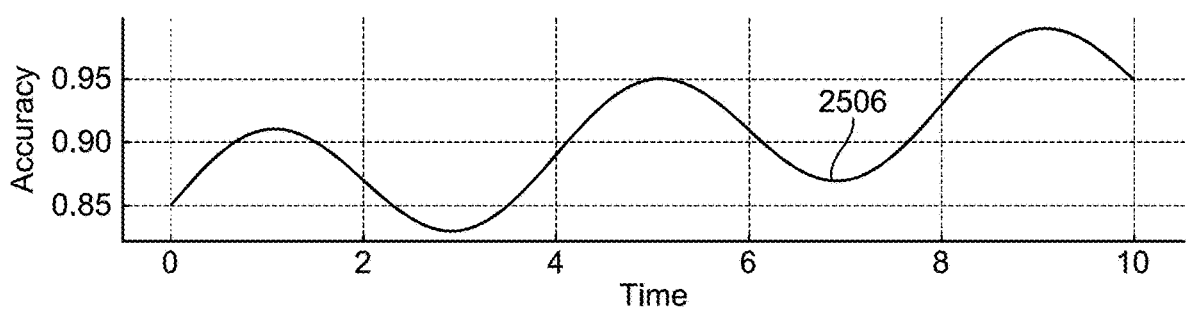
FIG. 25C illustrates a plot of material identification accuracy over time, indicating adaptive system response to dynamic conditions, in accordance with an exemplary aspect of the disclosure.

FIG. 25C presents the material identification accuracy of the AI-enhanced white noise radar system as a function of time. The waveform 2506 in FIG. 25C exhibits natural fluctuations, with observable peaks and troughs resulting from transient conditions and signal complexity. These variations simulate practical deployments where environmental noise, target diversity, and system recalibration dynamically affect performance. The plot confirms that the radar system maintains high accuracy levels while adapting to temporal variability.

Figure 25D:
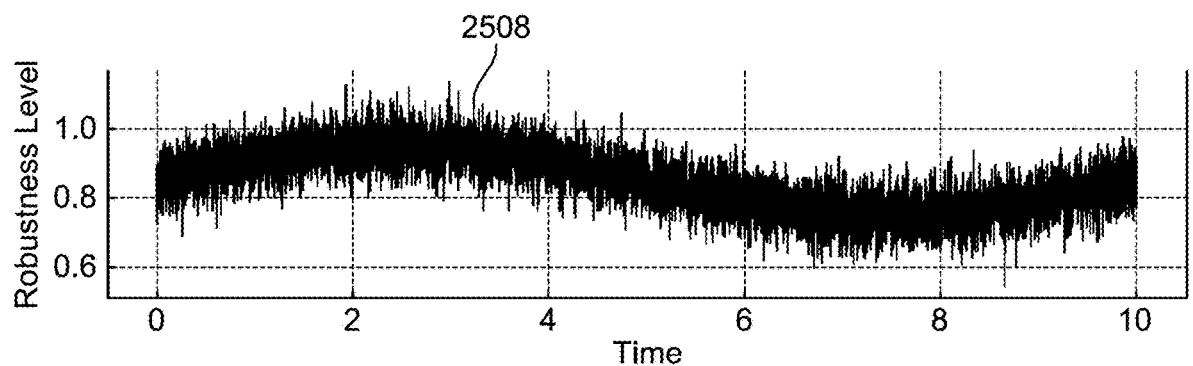
FIG. 25D illustrates a robustness plot showing system resilience against signal interference over time, in accordance with an exemplary aspect of the disclosure.

FIG. 25D shows the robustness against signal interference over time. The waveform 2508 in FIG. 25D reflects the system's resilience to simulated interference, with values oscillating due to injected noise and signal disruption representative of real-world sources such as weather effects or electromagnetic interference from other systems. The ability to retain stable robustness values under varying interference loads demonstrates the effectiveness of the radar system's signal processing and AI-driven filtering mechanisms.

Figure 25E:
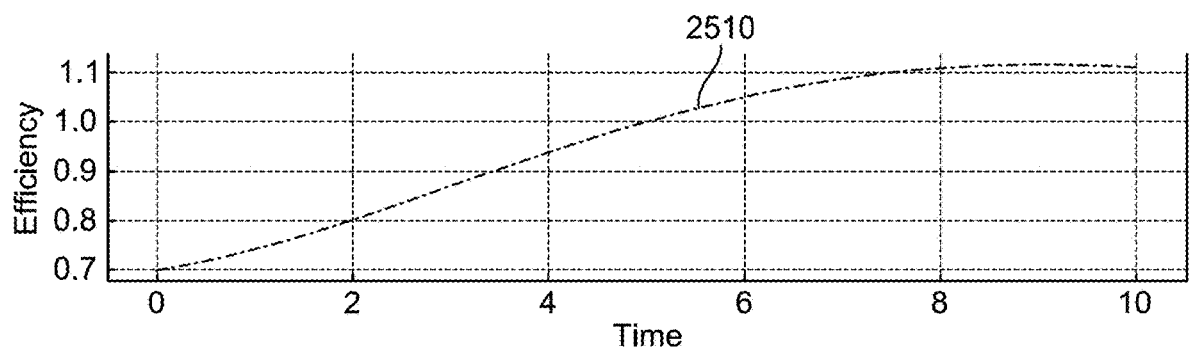
FIG. 25E illustrates a temporal plot of computational efficiency, demonstrating processing resource management across operational cycles, in accordance with an exemplary aspect of the disclosure.

FIG. 25E illustrates computational efficiency across time. The waveform 2510 represents the time-normalized computational throughput of the AI analysis module as it processes incoming radar data. The curve indicates a gradual change in efficiency modulated by the operational load, simulating scenarios where processing demands vary based on signal complexity and environmental context. This visualization is indicative of how the radar system balances performance and resource utilization during extended operation.

Figure 25F:
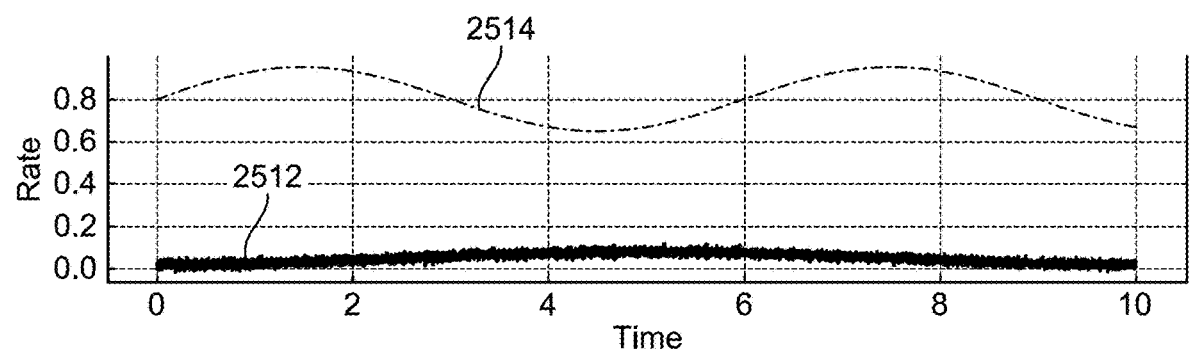
FIG. 25F illustrates a comparative plot of false positive rates and performance across environmental conditions over time, in accordance with an exemplary aspect of the disclosure.

FIG. 25F displays false positives and overall system performance across operational conditions over time. Two distinct curves are shown. Curve 2514 represents the false positive rate, while the second indicates the aggregate system performance across conditions such as different altitudes and weather scenarios. The false positive rate curve 2514 provides insight into the frequency of erroneous material identifications, while the performance curve 2516 reveals the system's adaptive capacity under varying environmental inputs. This dual-metric visualization offers a comparative perspective, highlighting how the radar system's accuracy is influenced by changing external factors.

Figure 26A:
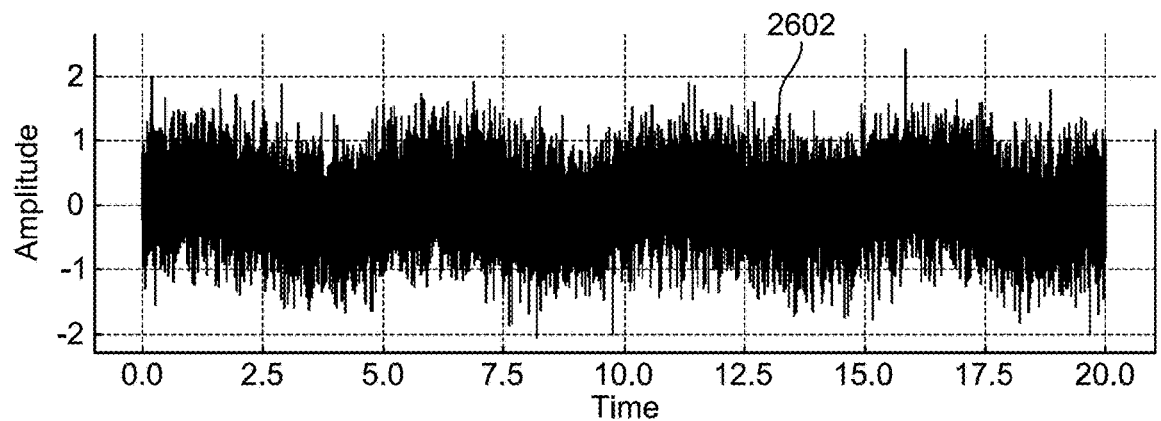
FIG. 26A illustrates an enhanced white noise radar signal incorporating periodic and random features simulating real-world variability, in accordance with an exemplary aspect of the disclosure.

FIG. 26A illustrates an enhanced white noise radar signal, depicted by a waveform 2602, generated by the AI-Enhanced White Noise Radar System. The waveform 2602 exhibits randomized fluctuations modulated by a periodic base component. This composite structure simulates environmental signal diversity that the radar system may encounter in real-world aerial scenarios. The modulation captures periodic environmental influences such as oscillatory background noise, while the random fluctuations emulate thermal noise and irregular atmospheric variations.

Figure 26B:
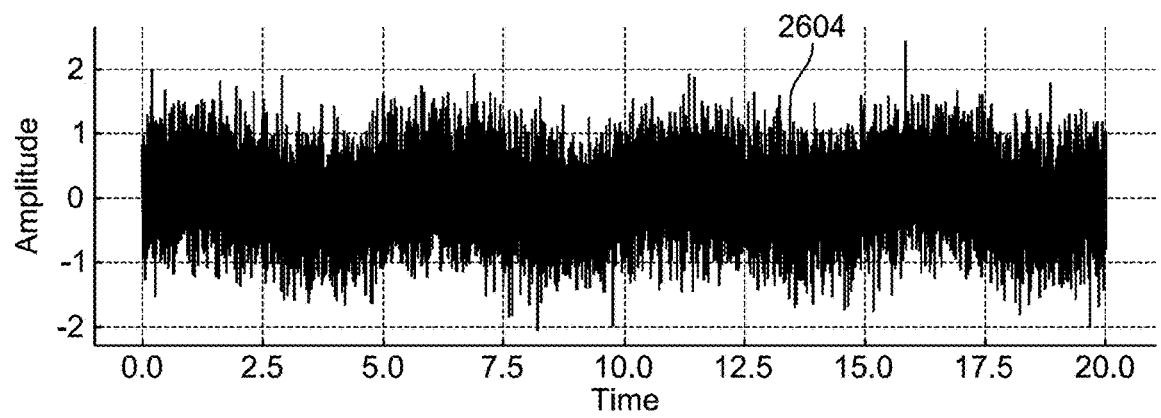
FIG. 26B illustrates a received radar signal incorporating material-dependent distortions, in accordance with an exemplary aspect of the disclosure.

FIG. 26B illustrates an enhanced received radar signal, which is captured following the transmission and reflection of the signal from various materials. A waveform 2604 reflects the interaction of the radar signal with target materials and includes perturbations resulting from environmental interferences. These received waveforms are subjected to material-dependent distortions that provide critical data for material classification. The waveform 2604 demonstrates the signal complexity arising from multipath reflections, material permittivity, and ambient environmental noise, all of which challenge and validate the robustness of the system's signal interpretation pipeline.

Figure 26C:
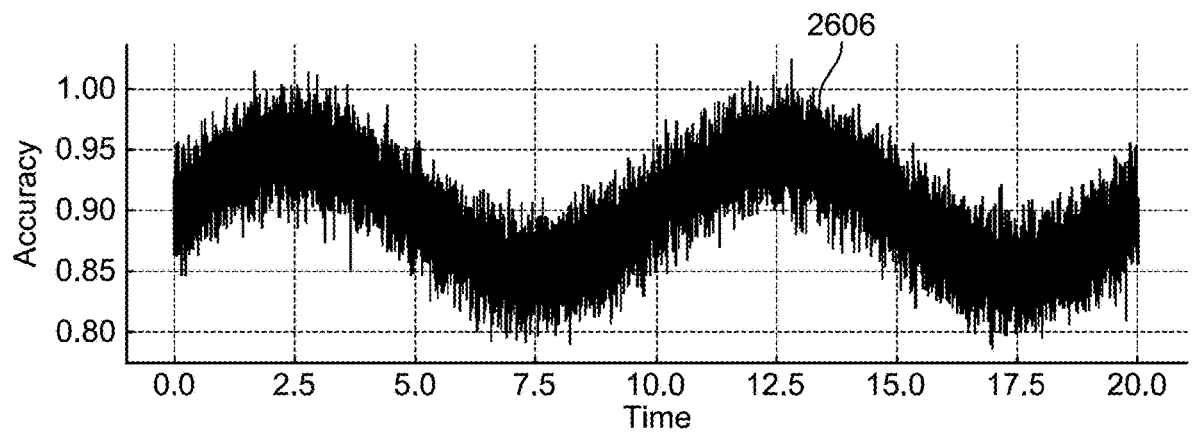
FIG. 26C illustrates a dynamic plot of material identification accuracy under varying environmental conditions, in accordance with an exemplary aspect of the disclosure.

FIG. 26C illustrates the material identification accuracy dynamics, depicted by a waveform 2606, over time. The waveform 2606 depicts periodic variability in identification accuracy, with accuracy levels oscillating in response to environmental conditions and material complexity. This dynamic behavior underscores the AI model's adaptive nature and its ability to recover from temporary reductions in accuracy. For instance, high accuracy peaks correspond to favorable signal-to-noise conditions, while troughs signify increased noise or signal degradation from complex or composite material reflections. Such trends confirm the model's learning-based resilience and its capacity to maintain an overall performance band above 90 percent under fluctuating inputs.

Figure 26D:
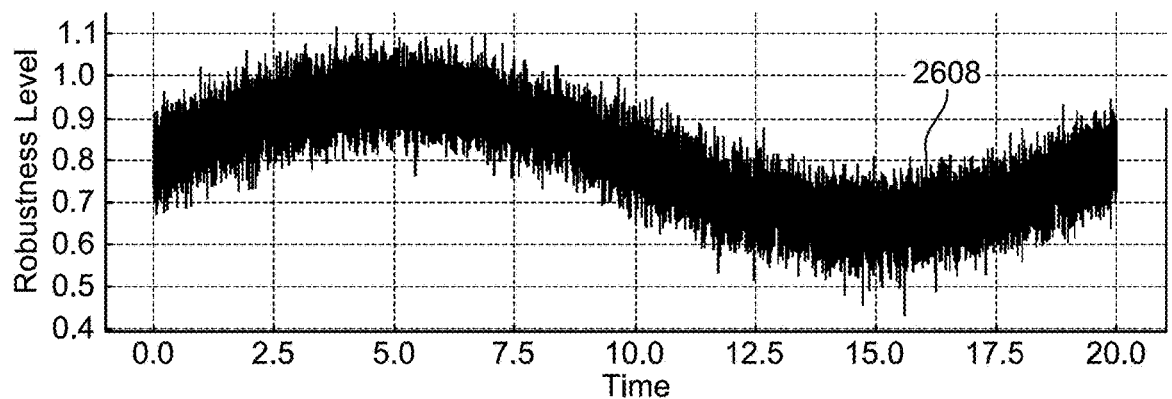
FIG. 26D illustrates the robustness dynamics against signal interference with both periodic and stochastic variation, in accordance with an exemplary aspect of the disclosure.

FIG. 26D illustrates the interference robustness dynamics, depicted by a waveform 2608, which captures the system's resilience in the presence of external signal perturbations, including electromagnetic interference and signal reflections from cluttered environments. The robustness level, defined as the system's ability to maintain signal fidelity and material detection integrity under interference, is plotted as a time-varying curve with embedded noise. The waveform 2608 shows a general sinusoidal trend overlaid with random fluctuations, thereby representing both systematic environmental transitions and stochastic disturbances such as burst noise or dynamic electromagnetic interference.

Figure 26E:
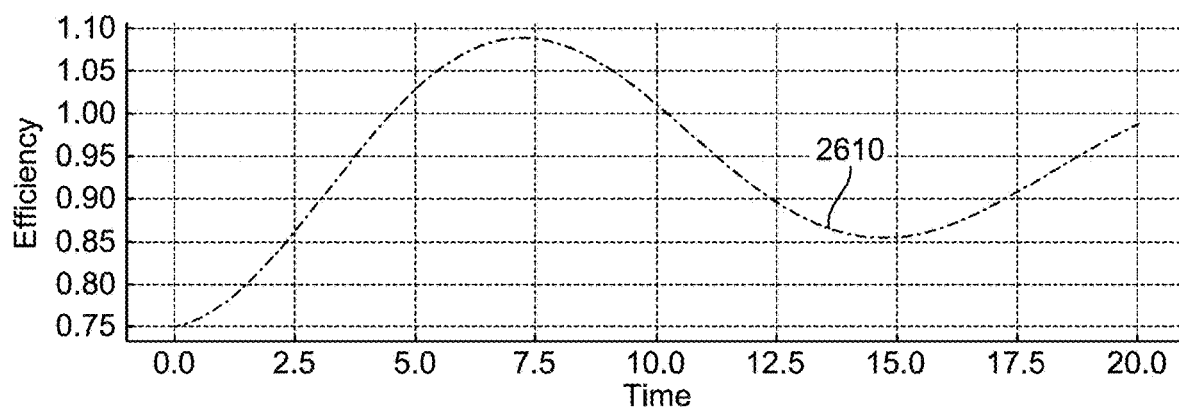
FIG. 26E illustrates a computational efficiency plot showing latency variations under adaptive load conditions, in accordance with an exemplary aspect of the disclosure.

FIG. 26E illustrates the computational efficiency dynamics, depicted by a waveform 2610, reflecting how the system's processing overhead changes over time under varying computational loads. The efficiency metric is expressed as an inverse function of processing latency per unit of input data. The waveform 2610 presents an initial ramp-up in computational demand, followed by a stabilization phase with periodic efficiency fluctuations. This dynamic is indicative of adaptive resource management by the system, where the load is redistributed to maintain throughput despite varying input complexities or concurrent tasks. Such behavior is critical for real-time deployments where consistent processing rates are essential.

Figure 26F:
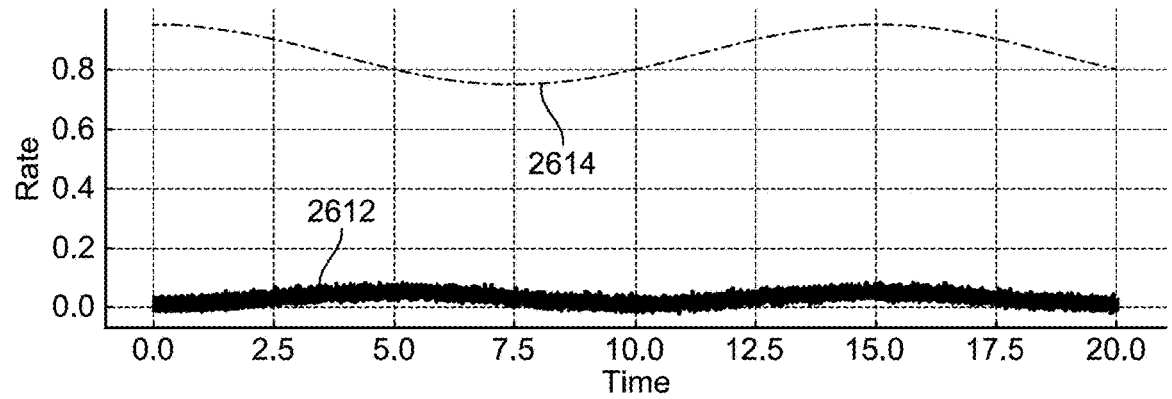
FIG. 26F illustrates time-based variations in false positive rates and identification accuracy across operational scenarios, in accordance with an exemplary aspect of the disclosure.

FIG. 26F illustrates the combined dynamics of false positive rate 2612 and performance across conditions 2614. The dual-plot representation captures the system's classification reliability and operational consistency across diverse environmental conditions such as varying altitudes, humidity levels, and material compositions. The false positive rate 2612 remains low throughout the evaluated period, reinforcing the AI model's precision in avoiding misclassification. In contrast, the performance metric 2614, which reflects mean identification accuracy under condition shifts, shows smooth periodic fluctuations, indicating robust adaptability.

Figure 27:
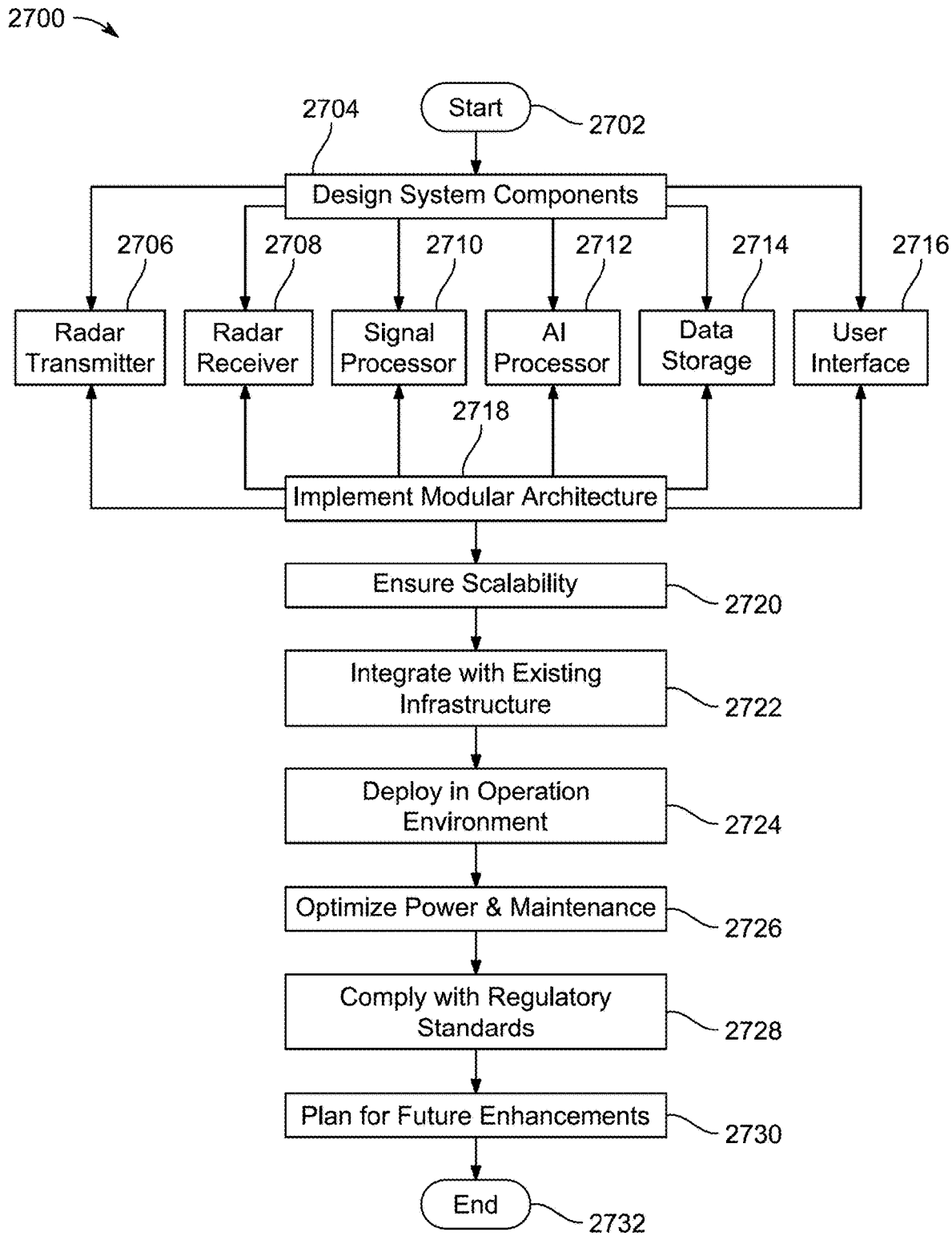
FIG. 27 illustrates a system design specification flowchart depicting modular architecture, component integration, deployment configuration, and future enhancement planning, in accordance with an exemplary aspect of the disclosure.

FIG. 27 illustrates a system design specification flowchart 2700 for the AI-Enhanced White Noise Radar System. The flowchart captures the essential components, architecture, and operational workflow necessary for implementing the radar system for identifying material composition of aerial objects, consistent with the disclosed invention.

At step 2702, the system design and development process is initiated. This includes a conceptual validation of the radar system architecture comprising a white noise radar transmitter, a radar receiver, a signal processor, an artificial intelligence processor, a user interface, and a data storage unit.

At step 2704, the system components are developed in accordance with the functional specifications. The radar transmitter, shown at step 2706, is configured to emit a white noise signal exhibiting a substantially flat power spectral density across a broadband spectrum. In one aspect, the transmitter supports a frequency range from 1 GHz to 40 GHz. The transmitter may operate in a continuous emission mode, enabling persistent real-time monitoring of aerial objects for dynamic environments.

The radar receiver is designed at step 2708. The receiver includes a plurality of spatially distributed antenna elements arranged to capture the reflected white noise signal from aerial objects. This spatial diversity facilitates improved signal acquisition and enhances the detection of reflections from both exterior surfaces and internal material layers of the aerial object. The receiver configuration also supports directional gain adjustments to improve detection fidelity under complex spatial reflection scenarios.

Step 2710 involves the design of a signal processor that is electrically coupled to the receiver. The signal processor is configured to filter and digitize the reflected signals, isolate frequency components associated with specific material signatures, and distinguish between external and internal reflections. The filtering functionality allows the system to extract spectral features corresponding to distinct material properties. One or more filtering circuits may be configured to isolate frequency-domain responses uniquely correlated to specific classes of materials, such as metals, plastics, or organic substances. These spectral components are then used as input for downstream analysis.

At step 2712, an artificial intelligence processor is developed to perform material identification analysis. The AI processor is electrically connected to the signal processor and is trained on a curated dataset of material reflection signatures. The AI module applies a machine learning model to the processed signal and derives classification outputs. In one implementation, the processor computes a Material Reflection Feature (MRF), which is a derived vector representing a composite material-specific signal metric. The MRF may be calculated from an amplitude profile of the reflected signal, a distance measurement between the radar system and the aerial object, and calibrated transmitter and receiver gain parameters. The MRF provides the AI system with high-fidelity classification capability by mapping signal features to known reflection patterns stored in memory.

At step 2714, a data storage unit is designed for integration with the AI processor. The storage unit comprises non-volatile memory for storing reflection signature libraries and allows fast retrieval for real-time AI-based comparison and classification. The stored signature library supports multiple material types, enhancing the adaptability of the system to varied operational contexts. These reference reflection signatures may include empirically obtained ground truth data or synthetic radar profiles generated via simulation.

Step 2718 pertains to the user interface, which is designed to display identification results and provide access to system configuration settings. The interface supports adjustment of parameters including detection sensitivity, emitted power level, threshold confidence values for identification, and scanning area limits. The interface may also present a confidence metric for each detected material, offering operational transparency and decision support to the user. In one aspect, the user interface allows operators to dynamically reconfigure identification thresholds and view summary analytics for each scan in real time.

At step 2720, a modular system architecture is implemented to support flexible deployment and maintainability. The radar system components are designed for integration within a portable enclosure, enabling mobile and compact implementations suited for field and tactical use. This modularity provides quick component upgrades and field-serviceable maintenance.

Step 2722 confirms that the radar system is scalable, with support for applications ranging from low-power handheld devices to high-performance stationary or mobile platforms. Step 2724 performs integration with legacy radar and surveillance infrastructure, supporting standardized communication formats and ensuring interoperability.

Step 2726 encompasses deployment across diverse environmental conditions. The system is designed for stable operation in varying weather conditions, atmospheric profiles, and altitudes. Environmental adaptability is embedded into the architecture through dynamic calibration and condition-aware signal processing. The radar system includes environment-aware filters that adaptively modify gain and filtering thresholds based on sensed conditions.

At step 2728, the system's power usage and maintenance framework are optimized. Power consumption is minimized through adaptive duty-cycling, and maintenance operations are designed for rapid diagnostics and component replacement in field environments. Regulatory compliance is verified at step 2730, covering emission limitations, safety protocols, and radar operation guidelines.

Future system enhancements are planned at step 2732. These enhancements include anticipated hardware upgrades, improved AI training modules, and algorithmic updates to increase accuracy and responsiveness in complex operational scenarios. Step 2734 marks the finalization of the system design specification and implementation plan, establishing a technically sophisticated, field-deployable radar platform capable of accurately identifying the material composition of aerial objects under a broad spectrum of conditions.

The AI-Enhanced White Noise Radar System, as depicted through FIG. 1 through FIG. 27, introduces a novel integration of broadband radar signal generation with advanced artificial intelligence-based signal processing for real-time material identification in aerial objects. Through the deployment of a white noise signal characterized by a substantially flat power spectral density, and the application of machine learning algorithms to analyze reflected signals, the system offers a highly accurate, robust, and computationally efficient solution to a range of detection and classification challenges.

The system architecture has been systematically validated through a rigorous proof-of-concept analysis. This included extensive simulation-based testing across diverse material types, environmental conditions, and interference scenarios. The findings affirm that the system achieves high material identification accuracy, maintains resilience under atmospheric and electromagnetic interference, and operates within acceptable computational timeframes for real-time deployment. The adaptive capabilities of the artificial intelligence processor, including its ability to continuously improve through data-driven learning, further reinforce the system's long-term reliability and practical applicability.

The design specifications outline a modular, scalable, and interoperable framework capable of seamless integration with existing radar and surveillance infrastructures. The system is suitable for deployment across varied operational environments and can be tailored to meet regulatory, maintenance, and power efficiency requirements. Furthermore, the disclosed system exhibits unique advantages over traditional radar technologies, including enhanced spectral resolution, intelligent pattern recognition, and operational adaptability under adverse environmental conditions. It stands as a versatile platform poised for deployment in domains, such as aerospace safety, defense and national security, environmental monitoring, autonomous systems, and industrial quality assurance.

Future development directions include the continued evolution of AI models, further miniaturization of hardware components for broader mobility, and fusion with complementary sensing modalities. These enhancements will serve to improve performance, extend functionality, and support new use cases, ensuring that the system remains at the forefront of intelligent radar technology.

Accordingly, the AI-Enhanced White Noise Radar System provides a transformative capability in the field of material identification and situational awareness, offering a significant advancement in safety, efficiency, and adaptability across a wide array of technical and commercial applications.

A structured comparative analysis delineating the advantages of the AI-Enhanced White Noise Radar System in relation to prevailing commercial products and technologies offered by various entities operating within the radar and surveillance technology sector was conducted.

The comparative analysis conducted against prevailing radar technologies in the market highlighted several distinct advantages of the AI-Enhanced White Noise Radar System. The analysis revealed that the system employed a broader frequency spectrum by utilizing white noise signal emission, which significantly improved material identification capabilities and reduced susceptibility to signal jamming or interference. Furthermore, the system integrated advanced artificial intelligence algorithms specifically for real-time material classification, a capability not prominently featured in conventional systems that predominantly focused on object detection and tracking. The system also demonstrated superior environmental robustness, maintaining high levels of accuracy and performance under adverse weather and atmospheric conditions where other systems exhibited signal degradation. In terms of computational efficiency, the radar system proved to be optimized for real-time processing, delivering faster response times with lower resource requirements. Additionally, the system's architecture was found to be highly scalable and readily integrable with existing surveillance infrastructures, offering operational flexibility that was often limited in more specialized radar platforms.

Table 1 describes how the invention may be tailored to address specific operational requirements. Table 1 further provides a comprehensive overview of how the AI-Enhanced White Noise Radar System may be utilized across multiple domains.

may be stored in memory 2802. These processes and instructions may also be stored on a storage medium disk 2804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2801, 2803 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 2801 or CPU 2803 may be a Xenon or Core processor from Intel of America or an Opteron processor from AMD of America, or may be other processor types that would be recognized by one of ordinary skill in the art. Alternatively, the CPU 2801, 2803 may be implemented on an FPGA, ASIC, PLD or using discrete logic circuits, as one of ordinary skill in the art would recognize. Further, CPU 2801, 2803 may be implemented as multiple processors cooperatively working in parallel to perform the instructions of the inventive processes described above.

Figure 28:
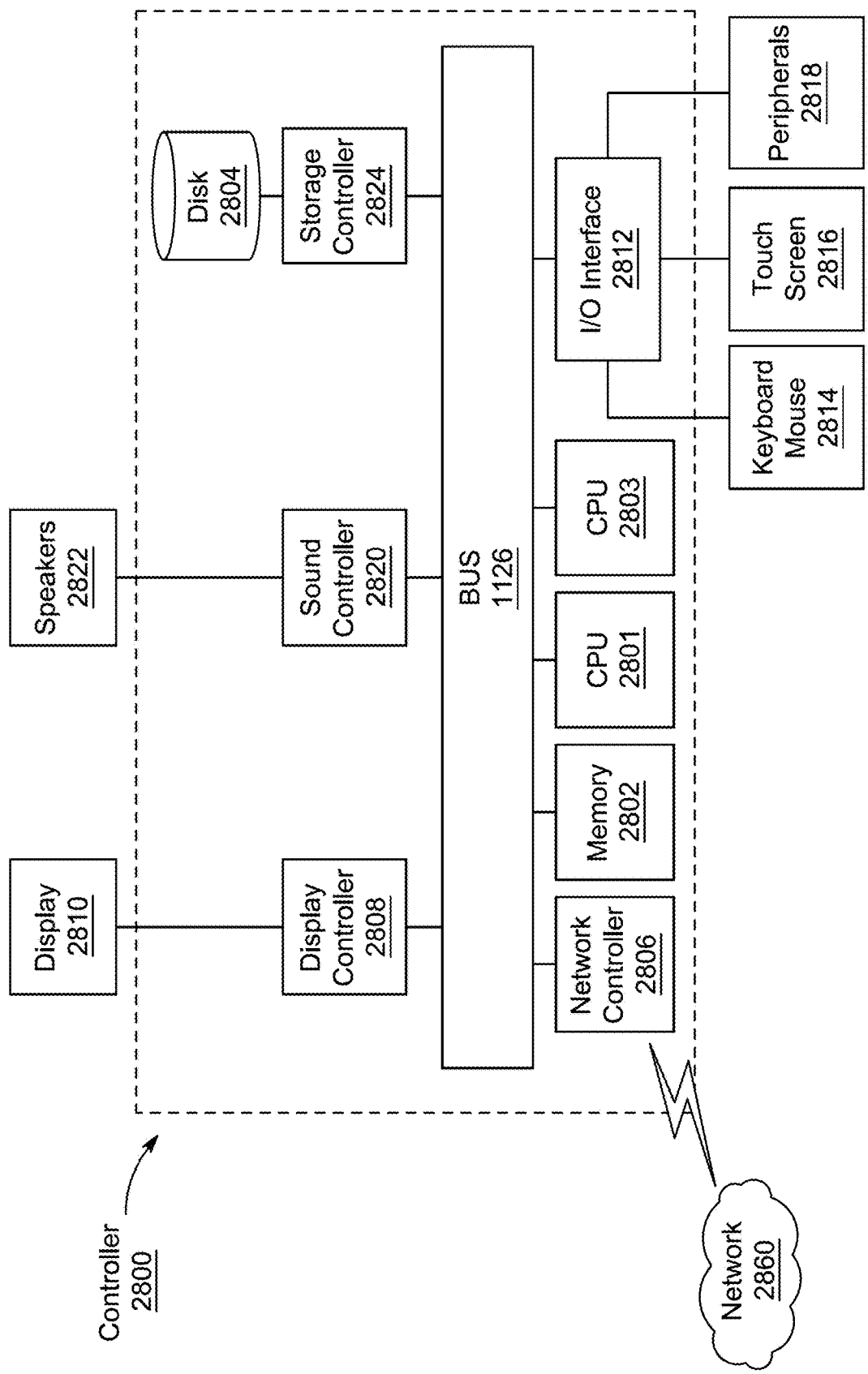
FIG. 28 is an illustration of a non-limiting example of details of computing hardware used in the UAV navigation system, according to certain embodiments.

The computing device in FIG. 28 also includes a network controller 2806, such as an Intel Ethernet PRO network interface card from Intel Corporation of America, for interfacing with network 2860. As can be appreciated, the network 2860 can be a public network, such as the Internet, or a private network such as an LAN or WAN network, or any combination thereof and can also include PSTN or ISDN sub-networks. The network 2860 can also be wired, such as an Ethernet network, or can be wireless such as a cellular network including EDGE, 3G, 4G and 5G wireless

TABLE 1

| Industry | Details of Commercial Product(s)/Service(s) that May Be Sold |
| --- | --- |
| Aviation and Aerospace | Advanced Aircraft Safety Systems: Systems integrating the radar to detect structural weaknesses or hazardous materials on aircraft in real-time, enhancing safety protocols and maintenance efficiency. |
| Defense and Security | Enhanced Surveillance Radar: Deployable on drones or fixed installations for border security and military bases, capable of identifying stealth materials and objects with reduced risk of interference. |
| Environmental Monitoring | Atmospheric Analysis Tools: Systems designed for meteorological stations to monitor air quality, detect pollutants, and provide data for environmental research with enhanced accuracy. |
| Industrial Manufacturing | Material Quality Assurance Radar: Integrated systems for manufacturing lines that continuously monitor material consistency and detect defects, improving product quality and compliance. |
| Autonomous Vehicles | Obstacle Detection Systems: Embedded radar systems that provide detailed environmental mapping and material identification, crucial for enhancing the navigational capabilities of autonomous vehicles. |

Next, further details of the hardware description of the computing environment according to exemplary embodiments is described with reference to FIG. 28. In FIG. 28, a controller 2800 is described as representative of the system 200 of FIG. 2, in which the controller is a computing device that includes a CPU 2801, which performs the processes described above/below. The process data and instructions cellular systems. The wireless network can also be WiFi, Bluetooth, or any other wireless form of communication that is known.

The computing device further includes a display controller 2808, such as a NVIDIA GeForce GTX or Quadro graphics adaptor from NVIDIA Corporation of America for interfacing with display 2810, such as a Hewlett Packard HPL2445w LCD monitor. A general purpose I/O interface 2812 interfaces with a keyboard and/or mouse 2814 as well as a touch screen panel 2816 on or separate from display 2810. General purpose I/O interface also connects to a variety of peripherals 2828 including printers and scanners, such as an OfficeJet or DeskJet from Hewlett Packard.

A sound controller 2820 is also provided in the computing device such as Sound Blaster X-Fi Titanium from Creative, to interface with speakers/microphone 2822 thereby providing sounds and/or music.

The general purpose storage controller 2824 connects the storage medium disk 2804 with communication bus 2826, which may be an ISA, EISA, VESA, PCI, or similar, for interconnecting all of the components of the computing device. A description of the general features and functionality of the display 2810, keyboard and/or mouse 2814, as well as the display controller 2808, storage controller 2824, network controller 2806, sound controller 2820, and general purpose I/O interface 2812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 29.

Figure 29:
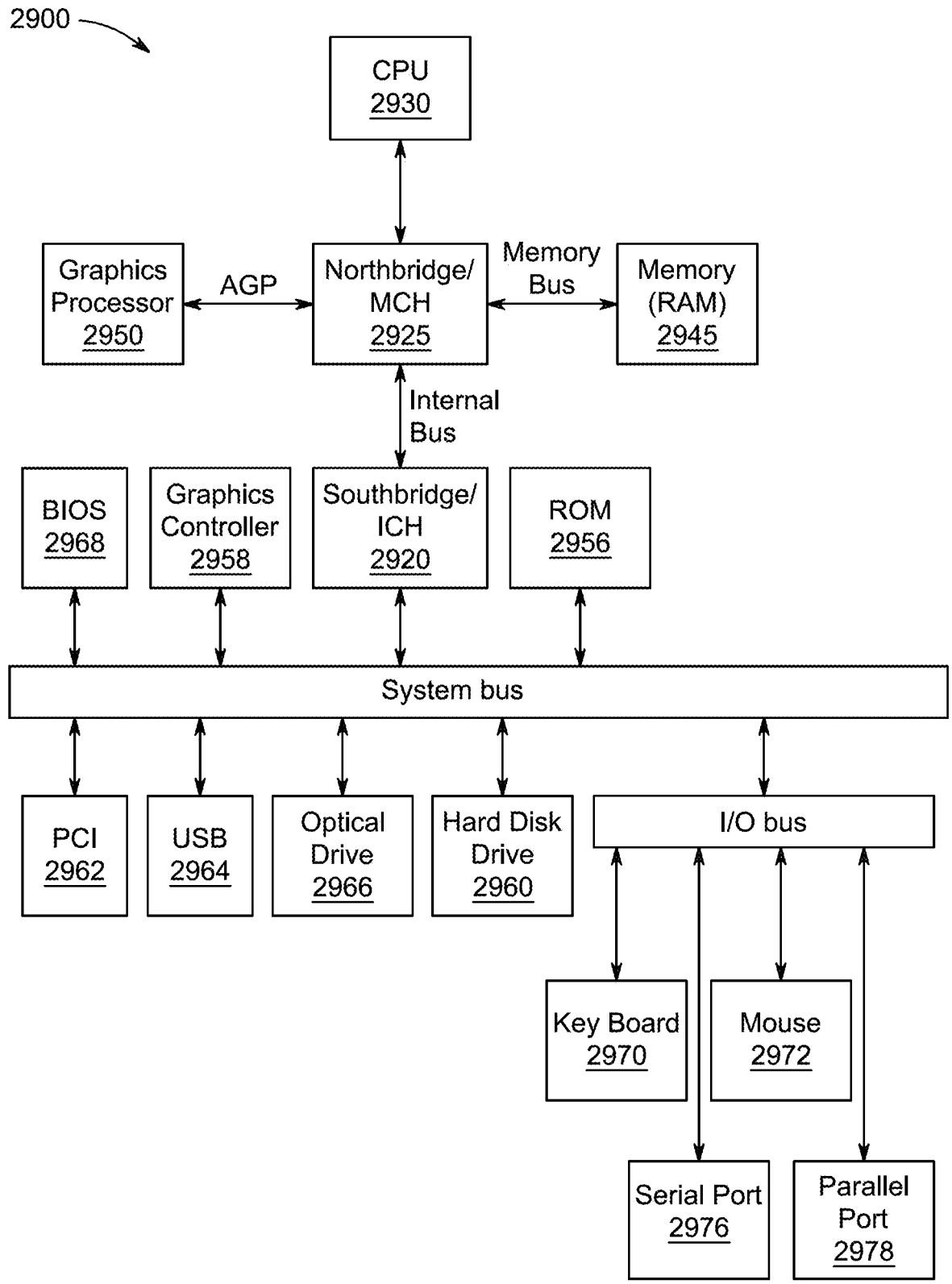
FIG. 29 is an exemplary schematic diagram of a data processing system used within the UAV navigation system, according to certain embodiments.

FIG. 29 shows a schematic diagram of a data processing system, according to certain embodiments, for performing the functions of the exemplary embodiments. The data processing system is an example of a computer in which code or instructions implementing the processes of the illustrative embodiments may be located.

In FIG. 29, data processing system 2900 employs a hub architecture including a north bridge and memory controller hub (NB/MCH) 2925 and a south bridge and input/output (I/O) controller hub (SB/ICH) 2920. The central processing unit (CPU) 2930 is connected to NB/MCH 2925. The NB/MCH 2925 also connects to the memory 2945 via a memory bus, and connects to the graphics processor 2950 via an accelerated graphics port (AGP). The NB/MCH 2925 also connects to the SB/ICH 2920 via an internal bus (e.g., a unified media interface or a direct media interface). The CPU Processing unit 2930 may contain one or more processors and even may be implemented using one or more heterogeneous processor systems.

Figure 30:
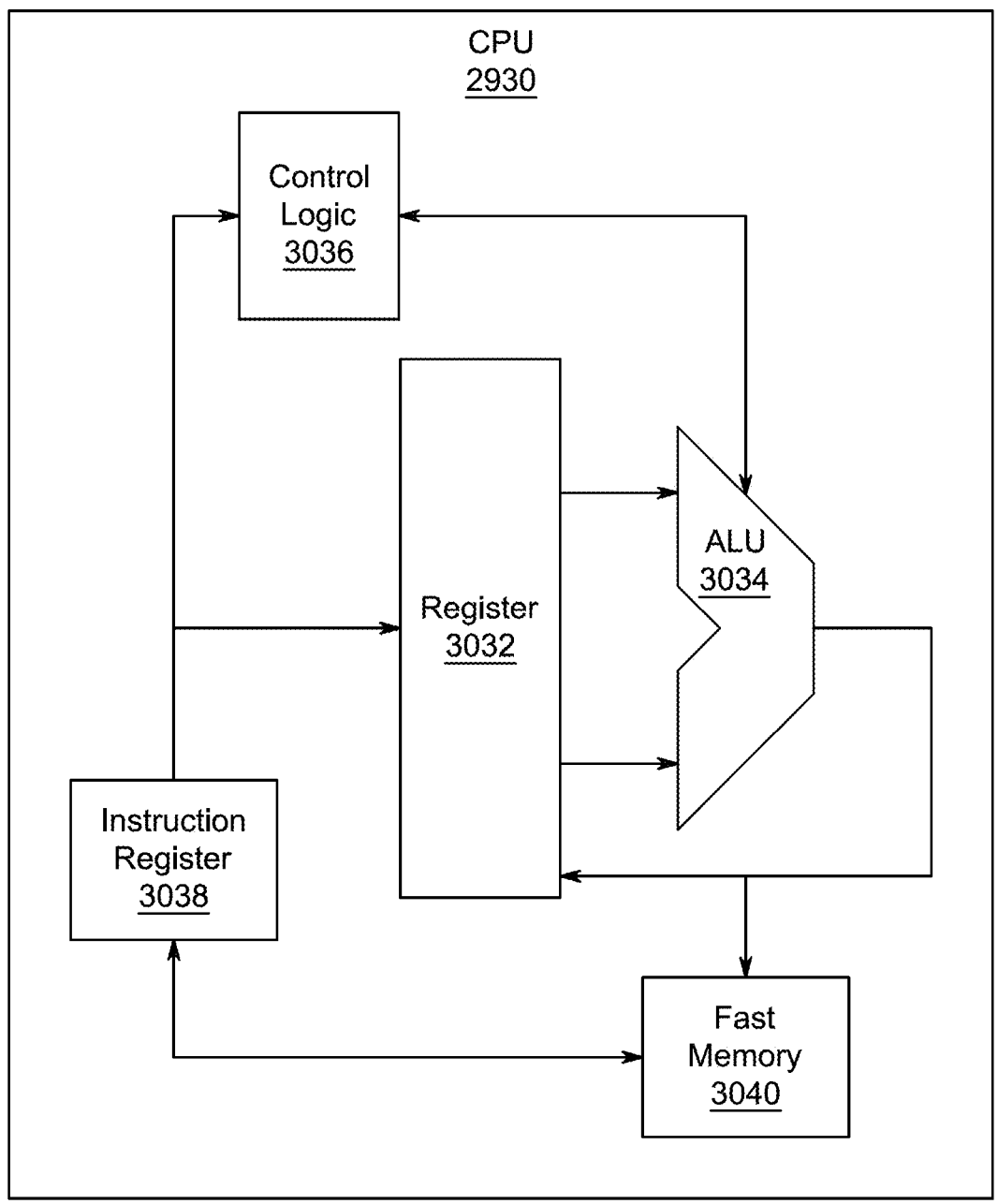
FIG. 30 is an exemplary schematic diagram of a processor used with the UAV navigation system, according to certain embodiments.

For example, FIG. 30 shows one implementation of CPU 2930. In one implementation, the instruction register 3038 retrieves instructions from the fast memory 3040. At least part of these instructions are fetched from the instruction register 3038 by the control logic 3036 and interpreted according to the instruction set architecture of the CPU 2930. Part of the instructions can also be directed to the register 3032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 3034 that loads values from the register 3032 and performs logical and mathematical operations on the loaded values according to the instructions. The results from these operations can be feedback into the register and/or stored in the fast memory 3040. According to certain implementations, the instruction set architecture of the CPU 2930 can use a reduced instruction set architecture, a complex instruction set architecture, a vector processor architecture, a very large instruction word architecture. Furthermore, the CPU 2930 can be based on the Von Neuman model or the Harvard model. The CPU 2930 can be a digital signal processor, an FPGA, an ASIC, a PLA, a PLD, or a CPLD. Further, the CPU 2930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 29, the data processing system 2900 can include that the SB/ICH 2920 is coupled through a system bus to an I/O Bus, a read only memory (ROM) 2956, universal serial bus (USB) port 2964, a flash binary input/output system (BIOS) 2968, and a graphics controller 2958. PCI/PCIe devices can also be coupled to SB/ICH 2988 through a PCI bus 2962.

The PCI devices may include, for example, Ethernet adapters, add-in cards, and PC cards for notebook computers. The Hard disk drive 2960 and CD-ROM 2966 can use, for example, an integrated drive electronics (IDE) or serial advanced technology attachment (SATA) interface. In one implementation the I/O bus can include a super I/O (SIO) device.

Further, the hard disk drive (HDD) 2860 and optical drive 2966 can also be coupled to the SB/ICH 2920 through a system bus. In one implementation, a keyboard 2970, a mouse 2972, a parallel port 2978, and a serial port 2976 can be connected to the system bus through the I/O bus. Other peripherals and devices that can be connected to the SB/ICH 2920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 31:
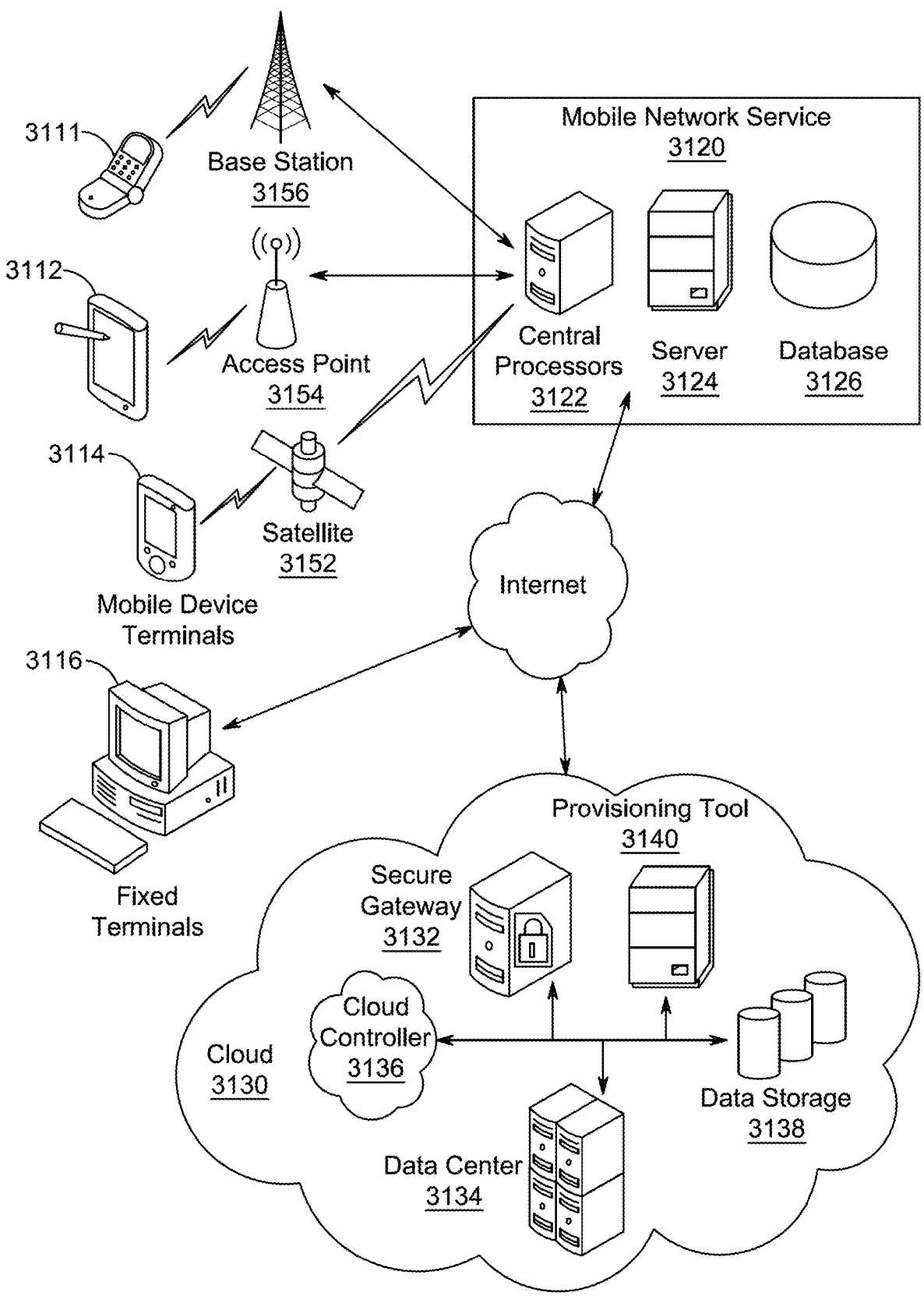
FIG. 31 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 3130 including a cloud controller 3136, a secure gateway 3132, a data center 3134, data storage 3138 and a provisioning tool 3140, and mobile network services 3120 including central processors 3122, a server 3124 and a database 3126, which may share processing, as shown by FIG. 31, in addition to various human interface and communication devices (e.g., display monitors 3116, smart phones 3119, tablets 3112, personal digital assistants (PDAs) 3114). The network may be a private network, such as a LAN, satellite 3152 or WAN 3154, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A radar system for identifying material composition of an aerial object, comprising:
    a transmitter configured to emit a white noise signal having a substantially flat power spectral density towards the aerial object;
    a receiver to capture a reflected white noise signal reflected from the aerial object,
    a signal processor to filter the reflected white noise signal and form a processed signal,
    an artificial intelligence processor configured to analyze the processed signal and identify a material composition of the aerial object based on a machine learning model; and
    a user interface that displays material identification results and provides system configuration controls.

2. The radar system of claim 1, wherein the white noise signal emitted by the transmitter comprises a random signal with frequency invariant power spectral density across a frequency spectrum ranging from 1 GHz to 40 GHz.

3. The radar system of claim 1, wherein the receiver comprises a plurality of antenna elements positioned to capture the reflected white noise signal, wherein the plurality of antenna elements provides spatial diversity of the received reflection signal.

4. The radar system of claim 1, wherein the signal processor is electrically connected to the receiver and includes a circuitry configured to process the reflected white noise signal and separate a reflection of the white noise signal originating from the exterior surface of the aerial object from a reflection of the white noise signal originating from a material contained within the aerial object.

5. The radar system of claim 1, wherein the signal processor includes a filtering circuit configured to isolate a frequency component from the reflected white noise signal that corresponds to a distinctive material property.

6. The radar system of claim 1, wherein the artificial intelligence processor is electrically connected to the signal processor and receives the processed signal for analysis.

7. The radar system of claim 6, wherein the artificial intelligence processor is configured to calculate a Material Reflection Feature (MRF) based on an amplitude of the reflected signal, a distance measurement to the aerial object, a transmitter gain value, and a receiver gain value.

8. The radar system of claim 1, further comprising a data storage unit electrically connected to the artificial intelligence processor, wherein the data storage unit includes a non-volatile memory configured to store a plurality of reference reflection signatures corresponding to a plurality of known materials.

9. The radar system of claim 8, wherein the artificial intelligence processor compares the processed signal against the plurality of stored reference reflection signatures and implements a plurality of classification algorithms to identify a material composition within the aerial object based on their unique reflection pattern in the processed signal.

10. The radar system of claim 1, wherein the white noise radar transmitter emits the white noise signal in a continuous manner to provide real-time monitoring of the aerial object.

11. The radar system of claim 1, further comprising a time synchronization module electrically connected to both the white noise radar transmitter and the receiver, wherein the time synchronization module correlates the emitted white noise signal with the captured reflected white noise signal to determine a time delay for calculating a range to the aerial object.

12. The radar system of claim 1, wherein the system configuration controls include adjustable parameters selected from the group consisting of detection sensitivity, power level of the white noise signal, material identification threshold, and scanning range.

13. The radar system of claim 1, wherein the user interface displays a confidence score associated with the identified material composition of the aerial object.

14. The radar system of claim 1, wherein the white noise radar transmitter, the receiver, the signal processor, the artificial intelligence processor, and the user interface are integrated into a single portable housing.

15. A method for identifying a material composition of an aerial object, comprising:
    transmitting a white noise signal in a broadband signal comprising plurality of frequencies from a white noise radar transmitter towards the aerial object,
    capturing, by a receiver, a reflected white noise signal reflected from the aerial object,
    processing the reflected signal by a signal processor to filter the reflected signal and form a processed signal,
    analyzing the processed signal by an artificial intelligence processor to identify a material composition of the aerial object based on a machine learning model; and
    displaying material identification results on a user interface.

16. The method of claim 15, further comprising:
    calculating a Material Reflection Feature (MRF) based on an amplitude of the reflected signal, a distance measurement to the aerial object, a transmitter gain value, and a receiver gain value; and
    comparing the processed signal against a plurality of stored reference reflection signatures to identify the material composition of the aerial object.

* * * * *